United States Patent
Saito et al.

(10) Patent No.: US 11,637,672 B2
(45) Date of Patent: Apr. 25, 2023

(54) TERMINAL AND WIRELESS COMMUNICATION METHOD FOR RECEIVING A DEMODULATION REFERENCE SIGNAL

(71) Applicant: NTT DOCOMO, INC., Tokyo (JP)

(72) Inventors: Keisuke Saito, Tokyo (JP); Kazuaki Takeda, Tokyo (JP); Kazuki Takeda, Tokyo (JP); Satoshi Nagata, Tokyo (JP); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,160

(22) PCT Filed: Aug. 7, 2017

(86) PCT No.: PCT/JP2017/028638
§ 371 (c)(1),
(2) Date: Feb. 8, 2019

(87) PCT Pub. No.: WO2018/030359
PCT Pub. Date: Feb. 15, 2018

(65) Prior Publication Data
US 2019/0173723 A1  Jun. 6, 2019

(30) Foreign Application Priority Data

Aug. 10, 2016 (JP) .............................. JP2016-157938
Dec. 7, 2016 (JP) .............................. JP2016-237974
Jan. 6, 2017 (JP) .............................. JP2017-001312

(51) Int. Cl.
*H04W 72/04* (2023.01)
*H04L 5/00* (2006.01)
(Continued)

(52) U.S. Cl.
CPC ......... *H04L 5/0051* (2013.01); *H04B 7/0413* (2013.01); *H04L 5/0048* (2013.01);
(Continued)

(58) Field of Classification Search
CPC . H04L 27/2695; H04L 27/26; H04L 27/2613; H04L 27/2607; H04L 27/22;
(Continued)

(56) References Cited

U.S. PATENT DOCUMENTS 9,258,104 B2 * 2/2016 Bashar ................ H04L 67/1076
10,165,559 B2 * 12/2018 Werner .................... H04L 1/00
(Continued)

FOREIGN PATENT DOCUMENTS

JP  2013-533715 A   8/2013
JP  2016-518758 A   6/2016
(Continued)

OTHER PUBLICATIONS

International Search Report issued in PCT/JP2017/028638 dated Oct. 24, 2017 (5 pages).
(Continued)

*Primary Examiner* — Un C Cho
*Assistant Examiner* — Lalita W Pace
(74) *Attorney, Agent, or Firm* — Osha Bergman Watanabe & Burton LLP

(57) ABSTRACT

This user terminal is provided with: a reception unit that receives a downlink signal including a demodulation reference signal; a signal separation unit that separates the demodulation reference signal from the downlink signal; and a channel estimation unit that calculates a channel estimation value by using the demodulation reference signal. The demodulation reference signal is mapped on a resource element set in a transmission pattern selected from a plurality of candidate patterns. The reception unit receives an
(Continued)

index indicating the transmission pattern, and the signal separation unit separates the demodulation reference signal by using the transmission pattern specified on the basis of the index.

5 Claims, 31 Drawing Sheets

(51) Int. Cl.
| | |
|---|---|
| *H04B 7/0413* | (2017.01) |
| *H04W 16/28* | (2009.01) |
| *H04L 27/26* | (2006.01) |
| *H04L 27/22* | (2006.01) |
| *H04W 72/0446* | (2023.01) |
| *H04W 72/0453* | (2023.01) |
| *H04B 7/0452* | (2017.01) |

(52) U.S. Cl.
CPC .............. *H04L 27/22* (2013.01); *H04L 27/26* (2013.01); *H04L 27/2607* (2013.01); *H04L 27/2613* (2013.01); *H04L 27/2695* (2013.01); *H04W 16/28* (2013.01); *H04W 72/04* (2013.01); *H04W 72/0446* (2013.01); *H04W 72/0453* (2013.01); *H04B 7/0452* (2013.01)

(58) Field of Classification Search
CPC .... H04L 5/0048; H04W 16/28; H04W 72/04; H04W 72/0453; H04W 72/0446; H04B 7/0413; H04B 7/0452
See application file for complete search history.

(56) References Cited

U.S. PATENT DOCUMENTS

| | | | | |
|---|---|---|---|---|
| 2012/0113842 | A1* | 5/2012 | Zhang | H04W 52/343 |
| | | | | 370/252 |
| 2012/0207084 | A1* | 8/2012 | Seo | H04B 7/155 |
| | | | | 370/315 |
| 2013/0287064 | A1* | 10/2013 | Seo | H04B 1/7103 |
| | | | | 375/144 |
| 2014/0044057 | A1* | 2/2014 | Gaal | H04W 72/042 |
| | | | | 370/329 |
| 2014/0071936 | A1* | 3/2014 | Zhang | H04W 72/044 |
| | | | | 370/330 |
| 2014/0211713 | A1 | 7/2014 | Ito | |
| 2014/0241150 | A1* | 8/2014 | Ng | H04W 52/02 |
| | | | | 370/229 |
| 2014/0286255 | A1* | 9/2014 | Nam | H04L 27/2613 |
| | | | | 370/329 |
| 2015/0223211 | A1* | 8/2015 | Seo | H04L 5/0048 |
| | | | | 370/329 |
| 2015/0282123 | A1* | 10/2015 | Miao | H04L 5/0051 |
| | | | | 455/450 |
| 2015/0282124 | A1* | 10/2015 | Miao | H04L 5/0051 |
| | | | | 455/450 |
| 2016/0006546 | A1* | 1/2016 | Yi | H04L 5/0094 |
| | | | | 370/329 |
| 2016/0087709 | A1* | 3/2016 | Horiuchi | H04B 7/068 |
| | | | | 375/260 |
| 2016/0112994 | A1* | 4/2016 | Wang | H04W 72/042 |
| | | | | 370/329 |
| 2017/0118745 | A1* | 4/2017 | Nogami | H04W 72/0406 |
| 2017/0288837 | A1* | 10/2017 | Namgoong | H04L 5/0007 |
| 2017/0302495 | A1* | 10/2017 | Islam | H04L 27/2613 |
| 2017/0353947 | A1* | 12/2017 | Ang | H04B 7/0413 |
| 2018/0026684 | A1* | 1/2018 | Wei | H04L 25/0242 |
| | | | | 370/329 |
| 2018/0110041 | A1* | 4/2018 | Bendlin | H04L 5/0007 |
| 2018/0212732 | A1* | 7/2018 | You | H04L 5/0051 |
| 2018/0220433 | A1* | 8/2018 | Li | H04B 7/0452 |
| 2018/0278391 | A1* | 9/2018 | Zhang | H04L 5/0053 |
| 2018/0324837 | A1* | 11/2018 | Tooher | H04W 72/0446 |
| 2019/0020455 | A1* | 1/2019 | Yamamoto | H04W 72/04 |
| 2019/0037554 | A1* | 1/2019 | Gao | H04L 5/0094 |
| 2019/0150159 | A1* | 5/2019 | Shi | H04L 5/0057 |
| | | | | 370/329 |
| 2020/0153583 | A1* | 5/2020 | Jiang | H04W 76/27 |

FOREIGN PATENT DOCUMENTS

| | | | | |
|---|---|---|---|---|
| WO | 2013/046470 A1 | 4/2013 | | |
| WO | WO-2014130082 A1 * | 8/2014 | .......... | H04L 5/0048 |

OTHER PUBLICATIONS

Written Opinion of the International Searching Authority issued in PCT/JP2017/028638 dated Oct. 24, 2017 (4 pages).
Samsung; "Discussions on DL control signalling for LTE-A MU-MIMO"; 3GPP TSG RAN WG1 #62, R1-104606; Madrid, Spain; Aug. 23-27, 2010 (3 pages).
Alcatel-Lucent Shanghai Bell, Alcatel-Lucent; "Enhancements of DMRS and Demodulation for V2V"; 3GPP TSG RAN WG1 Meeting #83, R1-156977; Anaheim, USA; Nov. 15-22, 2015 (11 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
Extended European Search Report issued in counterpart European Patent Application No. 17839430.0, dated Jul. 13, 2020 (11 pages).
Qualcomm Inc.; "Discussion on DM-RS enhancements for FD-MIMO"; 3GPP TSG-RAN WG1 #82bis, R1-155738 Malmo, Sweden; Oct. 5-9, 2015 (5 pages).
NTT DOCOMO; "Views on NR demodulation RS"; 3GPP TSG RAN WG1 Meeting #86, R1-167397; Gothenburg, Sweden; Aug. 22-26, 2016 (8 pages).
NTT DOCOMO; "WF on DMRS"; 3GPP TSG RAN WG1 Meeting #NR Ad-Hoc, R1-1701209; Spokane, USA; Jan. 16-20, 2017 (4 pages).
Office Action issued in European Application No. 17839430.0; dated Jul. 20, 2021 (4 pages).
Office Action issued in Japanese Application No. 2018-533468; dated Aug. 24, 2021 (8 pages).
Office Action issued in Indian Application No. 201917008176; dated Sep. 17, 2021 (7 pages).
Office Action issued in Japanese Application No. 2018-533468; dated Mar. 22, 2022 (7 pages).
Office Action issued in Chinese Application No. 201780061420.2 dated Sep. 5, 2022 (10 pages).
Decision of Refusal issued in Japanese Application No. 2018-533468 dated Oct. 11, 2022 (2 pages).
Decision of Dismissal issued in Japanese Application No. 2018-533468 dated Oct. 11, 2022 (4 pages).

* cited by examiner

TERMINAL AND WIRELESS COMMUNICATION METHOD FOR RECEIVING A DEMODULATION REFERENCE SIGNAL

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and/or the like in a Universal Mobile Telecommunication System (UMTS) network (NPL 1). Future systems of LTE (for example, the systems called LTE-A (LTE-Advanced), FRA (Future Radio Access), 5G (5th generation mobile communication system), 5G+ (5G plus), and New-RAT (Radio Access Technology)) have been also studied for achieving a broader bandwidth and a higher speed based on LTE.

In an existing LTE system (for example, LTE Re1.8-13), a transmission time interval (TTI) applied to downlink (DL) transmission and uplink (UL) transmission between a radio base station and a user terminal is set to 1 ms and controlled. TTI is a time unit during which channel-coded data packet (transport block) is transmitted, and is a processing unit, such as of scheduling, or link adaptation. TTI in the existing LTE system is also called a subframe, a subframe length and/or the like.

In the existing LTE system, in a case of a normal cyclic prefix (CP), one TTI includes 14 symbols. In the case of the normal CP, each symbol has a time length of 66.7 μs (symbol length), and the subcarrier interval is 15 kHz. In a case of an extended CP that is longer than a normal CP, one TTI includes 12 symbols.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

In a future radio communication system (for example 5G), to achieve requirements for an ultra-high rate, a large capacity, an ultra-low latency and/or the like, use of a broad frequency band has been studied. Accordingly, for the future radio communication system, it has been studied to secure a broad frequency band through use of a higher frequency band (hereinafter, called a high frequency band) (for example, 30 to 70 GHz band) than a relatively lower frequency band (hereinafter called a low frequency band) used in the existing LTE system.

The future radio communication system is assumed to secure a wide coverage using the low frequency band used in the existing LTE system. Designing a new radio access technology (RAT) (hereinafter called 5G RAT) supporting a wide frequency band ranging from a low frequency band to a high frequency band in such a future radio communication system has been studied.

The propagation path environment and/or requirements (the movement speed and/or the like of a supported terminal) are largely different among individual frequency bands, such as a low frequency band and a high frequency band. Accordingly, it is also assumed that different numerologies are introduced in 5G RAT. The numerology is a communication parameter in the frequency direction and/or the temporal direction (for example, at least one among the interval of subcarriers (subcarrier interval), the symbol length, the time length of CP (CP length), the time length of TTI (TTI length), the number of symbols per TTI, the radio frame configuration and/or the like).

In this manner, it is desired to support flexibly mapping of a reference signal and/or the like in the future radio communication system assumed to support a wide frequency band ranging from a low frequency band to a high frequency band and adopt different numerologies.

The present invention has been made in view of such a point. An object of the present invention is to provide a user terminal and a radio communication method that can realize a configuration of a reference signal and/or the like that is suitable to a future radio communication system.

Solution to Problem

A user terminal according to an aspect of the present invention includes: a receiver that receives a downlink signal including a demodulation reference signal; a signal separator that separates the demodulation reference signal from the downlink signal; and a channel estimator that calculates a channel estimation value, using the demodulation reference signal, in which: the demodulation reference signal is mapped to a resource element defined in a transmission pattern selected from among a plurality of candidate patterns, the receiver receives an index indicating the transmission pattern, and the signal separator separates the demodulation reference signal, using the transmission pattern identified based on the index.

Advantageous Effects of Invention

According to one aspect of the present invention, the configuration of a reference signal and/or the like that is suitable to the future radio communication system can be realized.

DESCRIPTION OF EMBODIMENTS (Development to Present Invention)

To support various services having a wide frequency band and/or different requirements, a radio access technology (5G RAT) of a future radio communication system is assumed to introduce one or more numerologies. Here, the numerology is a set of communication parameters (radio parameters) in the frequency and/or temporal directions. The set of communication parameters includes, for example, at least one of the subcarrier interval, the symbol length, the CP length, the TTI length, the number of symbols per TTI, and the radio frame configuration.

"The numerology is different" indicates that, for example, at least one of the subcarrier interval, the symbol length, the CP length, the TTI length, the number of symbols per TTI, and the radio frame configuration is different between numerologies. However, the indication is not limited to this.

Figure 1:
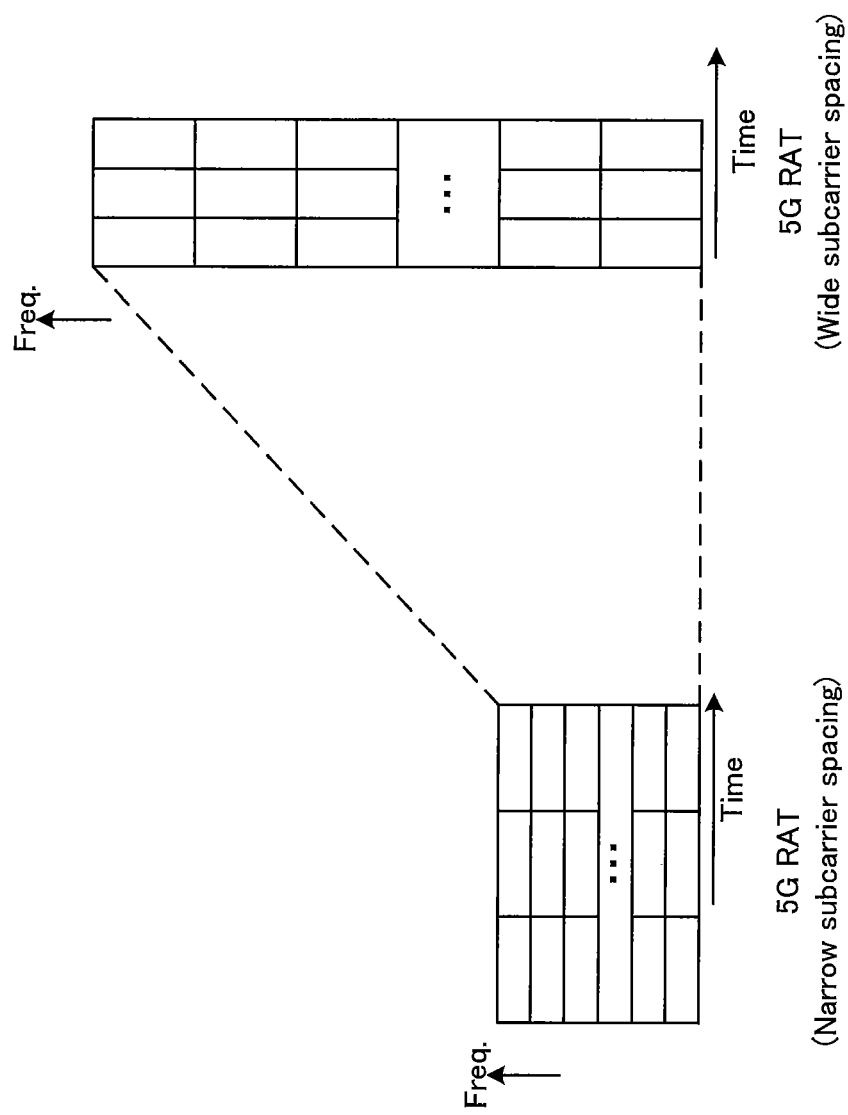
FIG. 1 illustrates one example of a numerology used in 5G RAT.

FIG. 1 illustrates one example of a numerology used in 5G RAT. As illustrated in FIG. 1, in 5G RAT, multiple numerologies having different symbol lengths and subcarrier intervals may be introduced. FIG. 1 exemplifies the symbol length and the subcarrier interval as an example of numerologies. However, the numerologies are not limited to these.

For example, FIG. 1 illustrates a first numerology that has a relatively narrow subcarrier interval (for example, 15 kHz), and a second numerology that has a relatively wide subcarrier interval (for example, 30 to 60 kHz). The subcarrier interval of the first numerology is 15 kHz, which is the same as the subcarrier interval of the existing LTE system. The subcarrier interval of the second numerology is N(N>1)-times as long as the subcarrier interval of the first numerology.

The subcarrier interval and the symbol length are reciprocals of each other. Accordingly, in the case where the subcarrier interval of the second numerology is configured to be N times as long as the subcarrier interval of the first numerology, the symbol length of the second numerology is 1/N times as long as the symbol length of the first numerology. Accordingly, as illustrated in FIG. 1, the first numerology and the second numerology are different from each other in the configuration of a resource element (RE) defined by the subcarrier and the symbol.

In the wide frequency band using the high frequency band higher than the low frequency band used in the existing LTE system, the future radio communication system where different numerologies are introduced may possibly cause degradation in estimation accuracy of channel estimation using a DL reference signal according to the mapping interval of the DL reference signal and/or the like in the frequency direction and/or temporal direction.

For example, in a case where a high carrier frequency is used, the Doppler frequency becomes higher than the relatively low carrier frequency. Accordingly, there is a possibility that the property of tracking the temporal variation in channel is degraded. In a case where a wide subcarrier interval is applied, there is a possibility that the resistance to the channel frequency selectivity is degraded in comparison with that in the case having a relatively narrow subcarrier interval. In such a case, unfortunately, degradation in the estimation accuracy of the channel estimation occurs, which causes degradation in communication quality.

With a certain subcarrier interval and/or symbol length, the number of DL reference signals increases because the DL reference signals and/or the like are mapped to an interval narrower than an interval sufficient to secure the estimation accuracy of the channel estimation. Accordingly, increase in overhead occurs.

In this manner, the future radio communication system requires appropriate mapping of the DL reference signal and/or the like. Accordingly, the present inventors have studied the configuration of the DL reference signal and/or the like suitable to the future radio communication system, and have achieved the present invention.

Hereinafter, each embodiment of the present invention is described in detail with reference to the accompanying drawings.

One Embodiment

Figure 2:
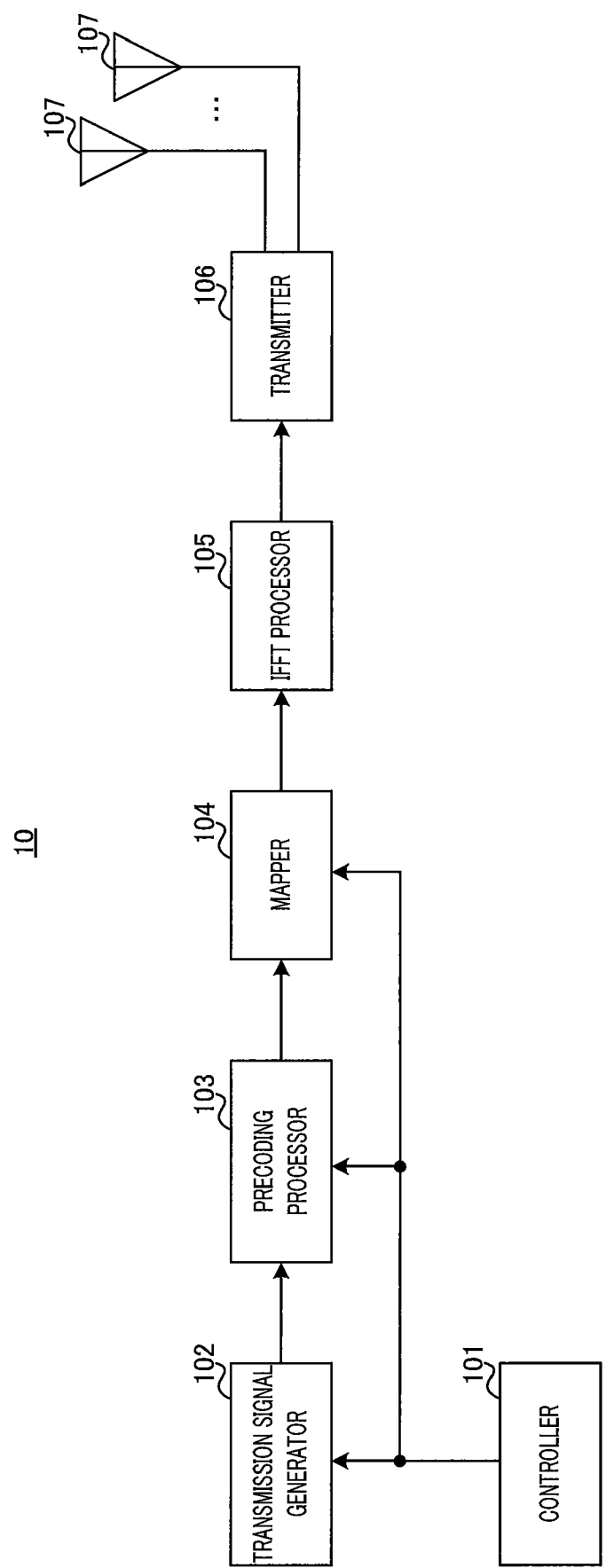
FIG. 2 is a block diagram illustrating a configuration example of a radio base station according to one embodiment of the present invention.
Figure 3:
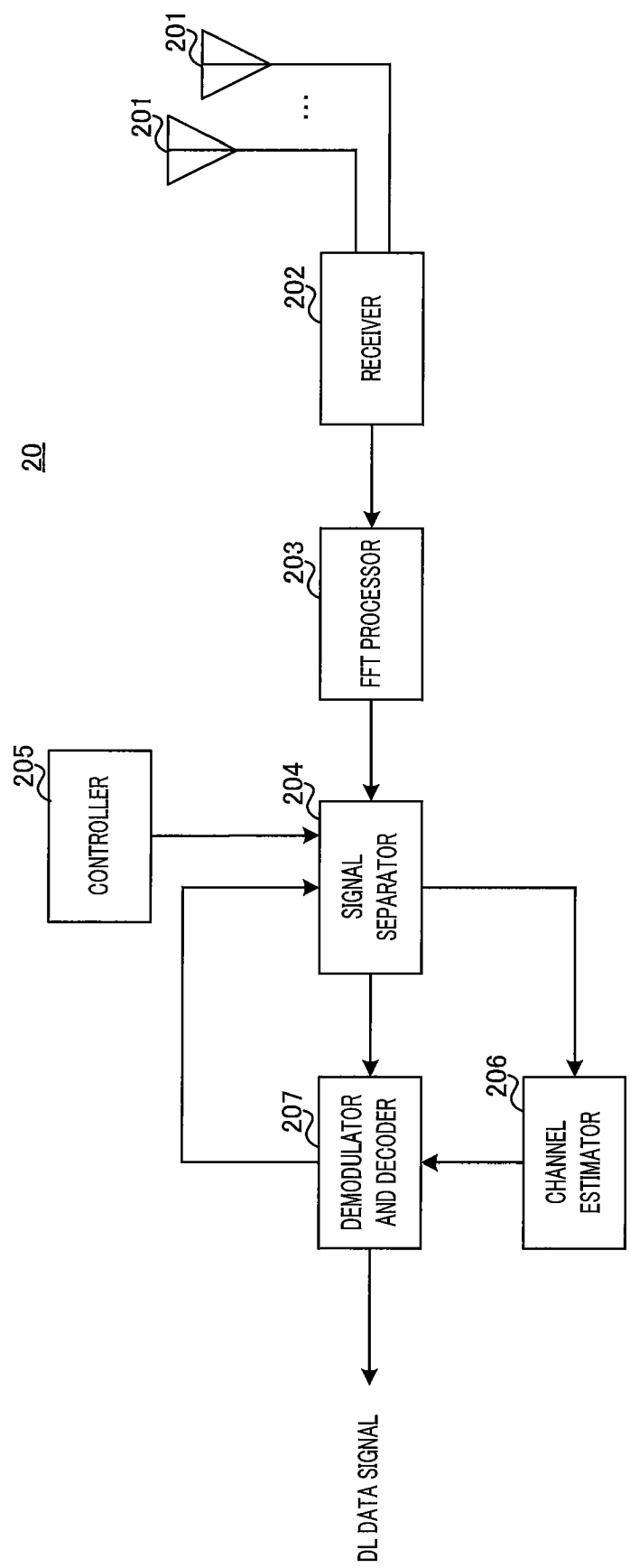
FIG. 3 is a block diagram illustrating a configuration example of a user terminal according to the one embodiment of the present invention.

A radio communication system according to this embodiment includes at least radio base station 10 illustrated in FIG. 2, and user terminal 20 illustrated in FIG. 3. User terminal 20 is connected to (accesses) radio base station 10. Radio base station 10 transmits, to user terminal 20, a DL signal that includes a DL data signal (for example, PDSCH), a DL reference signal (for example, a demodulation RS) for demodulating the DL data signal, and a DL control signal (for example, PDCCH).

<Radio Base Station>

FIG. 2 illustrates an example of the entire configuration of the radio base station according to this embodiment. Radio base station 10 illustrated in FIG. 2 adopts a configuration that includes controller 101, transmission signal generator 102, precoding processor 103, mapper 104, inverse fast Fourier transform (IFFT) processor 105, transmitter 106, and antenna 107.

Controller 101 (scheduler) performs scheduling (for example, resource assignment), such as of the DL data signal, DL control signal, and demodulation RS.

During scheduling, controller 101 selects a mapping pattern (transmission pattern) indicating a resource to which the demodulation RS is to be mapped, from among candidates of predefined mapping patterns (candidate patterns). Indices are associated with the respective mapping pattern candidates. User terminal 20 is then notified of the index indicating the selected mapping pattern; user terminal 20 identifies the pattern. The index indicating the selected mapping pattern may be notified to user terminal 20 using, for example, higher layer (for example, Radio Resource Control (RRC) or Medium Access Control (MAC)) signaling, or notified to user terminal 20 using physical layer (PHY) signaling.

Alternatively, the mapping pattern of the demodulation RS may be uniquely associated with at least one of other parameters (for example, information relating to the system bandwidth, carrier frequency, and DL data signal (for example, DL data signal mapping pattern and/or the like)). In this case, user terminal 20 can implicitly identify the mapping pattern of the demodulation RS on the basis of the other parameter. Consequently, signaling for mapping pattern notification can be reduced.

Details of the demodulation RS mapping pattern candidates, and the mapping pattern selecting method are described later.

Selection of the mapping pattern of the demodulation RS of the DL signal is not limited to that in a case of being executed in radio base station 10 (controller 101). Alternatively, the selection may be executed in user terminal 20, as described later. In a case where user terminal 20 selects the mapping pattern of the demodulation RS, radio base station 10 may receive, from user terminal 20, a notification about the index indicating the selected mapping pattern (not illustrated).

Controller 101 outputs scheduling information that includes the mapping pattern of the demodulation RS, to transmission signal generator 102 and mapper 104.

Controller 101 controls precoding for the DL data signal, the DL control signal, the demodulation RS and/or the like. For example, controller 101 determines presence or absence of application of precoding for these signals, and parameters used for application of precoding (for example, a precoding vector (sometimes called precoding weight, a weight coefficient and/or the like), an antenna port (port number), a transmission rank and/or the like). Controller 101 outputs precoding information that indicates the determined parameters, to transmission signal generator 102 and precoding processor 103.

Transmission signal generator 102 generates the DL signal (including the DL data signal, the DL control signal, and the demodulation RS). For example, the DL control signal includes downlink control information (DCI) that includes the scheduling information or precoding information input from controller 101. Transmission signal generator 102 performs an encoding process and a modulation process for the DL signal. Transmission signal generator 102 outputs the generated DL signal to precoding processor 103.

Precoding processor 103 performs precoding the DL signal input from transmission signal generator 102, on the basis of the precoding information input from controller 101. If precoding processor 103 does not perform precoding the DL control signal, precoding processor 103 outputs the DL control signal, as it is, to mapper 104.

Mapper 104 maps the DL signal input from precoding processor 103 to a predetermined radio resource on the basis of the scheduling information input from controller 101. At this time, mapper 104 maps the demodulation RS to the radio resource indicated by the mapping pattern of the demodulation RS included in the scheduling information. Mapper 104 outputs the DL signal mapped to the radio resource, to IFFT processor 105.

IFFT processor 105 performs an IFFT process for a DL signal that is a frequency domain signal input from mapper 104, and outputs a DL signal that is a time domain signal (that is, a signal made up of OFDM symbols) to transmitter 106. In FIGS. 1 and 2, as an example of the DL signal, a signal based on OFDM modulation is adopted. However, the DL signal is not limited to the signal based on OFDM modulation. Alternatively, the signal may be a signal based on another scheme (for example, Single Carrier-Frequency Division Multiple Access (SC-FDMA) or DFT-Spread-OFDM (DFT-S-OFDM)).

Transmitter 106 performs transmission processes, such as up-conversion and amplification, for the baseband DL signal input from IFFT processor 105, and transmits the DL signal (radio frequency signal) through antenna 107.

<User Terminal>

FIG. 3 illustrates an example of the entire configuration of user terminal 20 according to this embodiment. User terminal 20 illustrated in FIG. 3 adopts a configuration that includes antenna 201, receiver 202, fast Fourier transform (FFT) processor 203, signal separator 204, controller 205, channel estimator 206, and demodulator and decoder 207.

The DL signal (radio frequency signal) received through antenna 201 is input to receiver 202. The DL signal includes the DL data signal, and demodulation RS.

Receiver 202 performs reception processes, such as amplification and down-conversion, for the radio frequency signal received through antenna 201, and outputs the baseband DL signal to FFT processor 203.

FFT processor 203 performs an FFT process for the DL signal that is a time domain signal input from receiver 202, and outputs a DL signal that is a frequency domain signal to signal separator 204.

Signal separator 204 separates (demaps) the demodulation RS from the DL signal input from receiver 202 on the basis of the mapping pattern of the demodulation RS indicated by the index notified from radio base station 10, and outputs the demodulation RS to channel estimator 206.

Signal separator 204 separates (demaps) the DL data signal and/or the like from the DL signal on the basis of the scheduling information (for example, assigned resource) input from demodulator and decoder 207, and outputs the DL data signal to demodulator and decoder 207.

Controller 205 selects a mapping pattern (transmission pattern) indicating a resource to which a demodulation RS of the DL signal is to be mapped, from among candidates of predefined mapping patterns (candidate patterns). The index indicating the selected mapping pattern is output to signal separator 204. Through notification about the index indicating the selected mapping pattern to radio base station 10, radio base station 10 identifies the pattern, and maps the demodulation RS of the DL signal on the basis of the identified mapping pattern. As described above, selection of the mapping pattern of the demodulation RS of the DL signal may be executed by radio base station 10 (controller 101).

Channel estimator 206 performs channel estimation using the demodulation RS input from signal separator 204, and calculates a channel estimation value. Channel estimator 206 outputs the calculated channel estimation value to demodulator and decoder 207.

Demodulator and decoder 207 performs a demodulation process and a decoding process for the DL data signal input from signal separator 204, using the channel estimation value input from channel estimator 206. For example, demodulator and decoder 207 performs channel compensation (equalization process) for the DL data signal that is a demodulation target, using the channel estimation value of the resource to which the demodulation-target DL data signal has been mapped, and demodulates the channel-compensated DL data signal.

<Mapping Pattern of Demodulation RS>

Next, the mapping pattern of the demodulation RS is described in detail with reference to FIG. 4.

Figure 4:
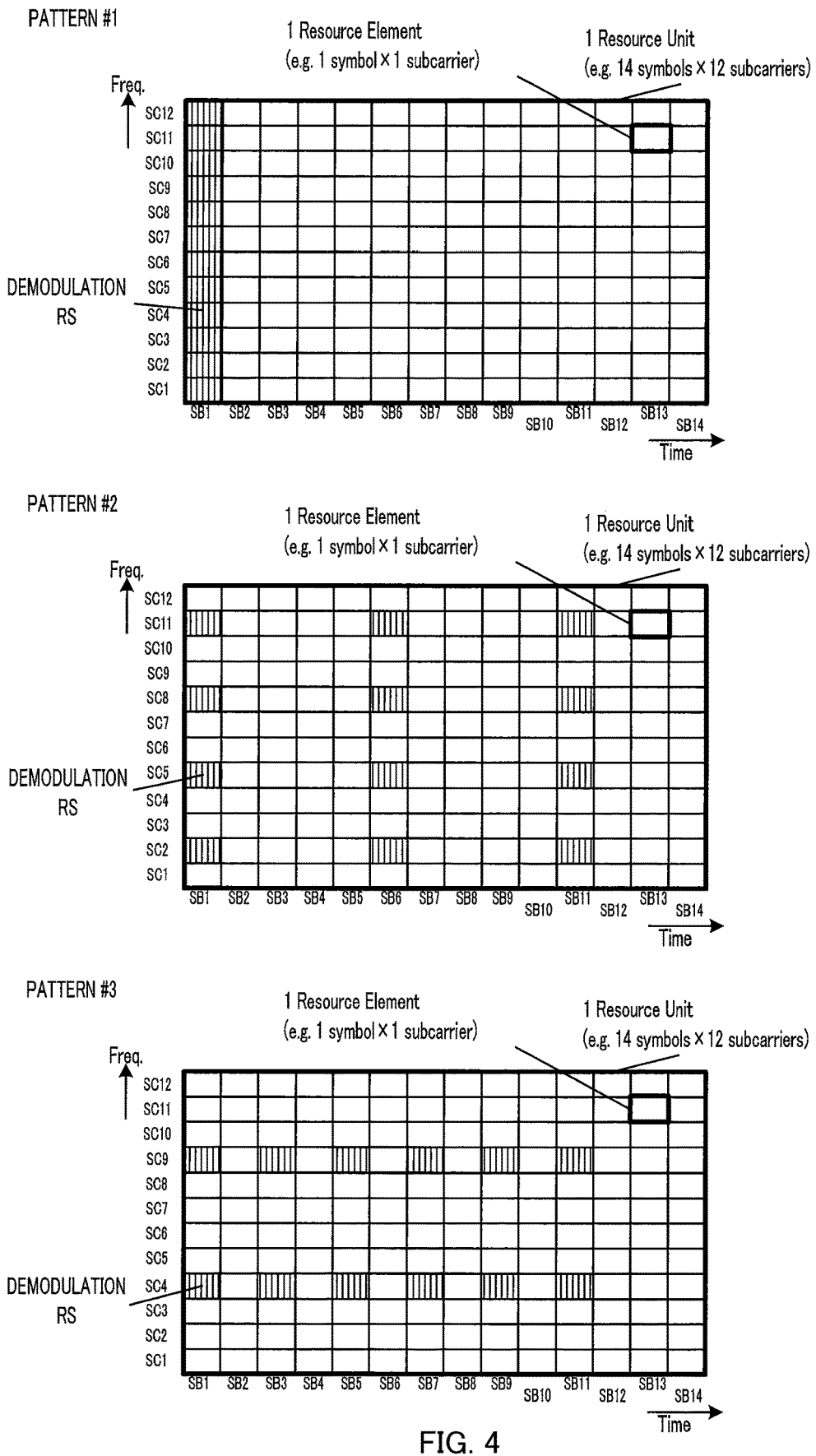
FIG. 4 illustrates an example of mapping patterns of a demodulation RS according to the one embodiment of the present invention.

FIG. 4 illustrates an example of the mapping patterns of the demodulation RS according to this embodiment. FIG. 4 illustrates three mapping patterns of the demodulation RS (pattern #1 to pattern #3) as examples. Each mapping pattern indicates the mapping position of the demodulation RS in a resource unit (RU) serving as a resource assigning unit (also called a resource block, a resource block pair and/or the like). RU has a configuration including 168 resource elements (REs) where 14 REs are arranged in the frequency direction and 12 REs are arranged in the temporal direction. One RE is a radio resource domain defined on the basis of one symbol and one subcarrier. In other words, one RU in FIG. 4 is defined on the basis of 14 symbols and 12 subcarriers.

In the following description, as illustrated in FIG. 4, the 14 symbols of RU in the temporal direction are called SB1 to SB14 sequentially from the left. The 12 subcarriers of RU in the frequency direction are called SC1 to SC12 from the bottom.

Pattern #1 is a pattern that maps the demodulation RS to 12 REs corresponding to SC1 to SC12 on SB1. Pattern #2 is a pattern that maps the demodulation RS to REs corresponding to SC2, SC5, SC8 and SC11 on SB1, SB6 and SB11. Pattern #3 is a pattern that maps the demodulation RS to REs corresponding to SC4 and SC9 on SB1, SB3, SB5, SB7, SB9 and SB11.

Pattern #1 is a pattern where the mapping interval of the demodulation RS in the frequency direction is the narrowest among those of the three mapping patterns (that is, the demodulation RS is mapped most densely in the frequency direction). Pattern #3 is a pattern where the mapping interval of the demodulation RS in the temporal direction is the narrowest among those of the three mapping patterns (that is, the demodulation RS is mapped most densely in the temporal direction). Pattern #2 is a pattern where the mapping intervals of the demodulation RS in the temporal direction and the frequency direction are mapping intervals that are intermediate between those of patterns #1 and #3.

The demodulation RS can improve the property of tracking the temporal variation in channel, through a method of mapping densely in the temporal direction. The demodulation RS can improve the resistance to the channel frequency selectivity, through a method of mapping densely in the frequency direction.

Accordingly, in this embodiment, as illustrated in FIG. 4, multiple mapping patterns having different mapping intervals of the demodulation RS in the frequency direction and different mapping intervals of the demodulation RS in the temporal direction are predefined as mapping pattern candidates (candidate patterns). A more preferable mapping pattern (transmission pattern) is selected from among the mapping pattern candidates, on the basis of information indicating whether it is better to improve the property of tracking the temporal variation in channel or to improve the resistance to the channel frequency selectivity, at a certain carrier frequency with a certain subcarrier interval.

For example, controller 101 of radio base station 10 selects one from among the three mapping pattern candidates illustrated in FIG. 4, on the basis of the maximum latency spread and the maximum Doppler frequency supported by the radio communication system including radio base station 10 and user terminal 20 at a certain carrier frequency with a certain subcarrier interval.

In detail, it is preferable that the mapping pattern of the demodulation RS be a pattern that satisfies the mapping interval of the demodulation RS in the frequency direction, the interval being defined on the basis of the maximum latency spread supported by the radio communication system, and satisfies the mapping interval of the demodulation RS in the temporal direction, the interval being defined on the basis of the maximum Doppler frequency supported by the radio communication system, at a certain carrier frequency with a certain subcarrier interval.

$\Delta f_{RS}$ is assumed as the mapping interval in the frequency direction, the interval being defined on the basis of the maximum latency spread. $\Delta t_{RS}$ is assumed as the mapping interval of the demodulation RS in the temporal direction, the interval being defined on the basis of the maximum Doppler frequency. In this case, $\Delta f_{RS}$ is a function of the maximum latency spread, and $\Delta t_{RS}$ is a function of the maximum Doppler frequency. $\Delta f_{RS}$ corresponds to the coherent bandwidth, for example. $\Delta t_{RS}$ corresponds to the coherent time interval, for example.

Controller 101 calculates, for example, the difference between the mapping interval of the demodulation RS of each mapping pattern candidate in the frequency direction and $\Delta f_{RS}$, and the difference between the mapping interval of the demodulation RS of each mapping pattern candidate in the temporal direction and $\Delta t_{RS}$, and selects the mapping pattern having the minimum sum of the calculated differences.

For example, in a case where $\Delta f_{RS}$ is four-subcarrier intervals and $\Delta t_{RS}$ is two-symbol intervals, controller 101 selects pattern #3 from among three mapping pattern candidates that are patterns #1 to #3.

In the example described above with reference to FIG. 4, the description has been made assuming that the one is selected from among the three patterns on the basis of the maximum latency spread supported by the radio communication system and the maximum Doppler frequency supported by the radio communication system. The conditions of selection from among the mapping pattern candidates are not limited to the maximum latency spread and the maximum Doppler frequency.

FIG. 4 illustrates the three mapping patterns as examples. However, the number of mapping patterns is not limited to this. The number of mapping patterns may be two, or four or more. The more the number of mapping patterns is, the more flexibly the mapping pattern is selected. Accordingly, a more preferable mapping pattern can be selected.

Alternatively, the mapping pattern candidates may be grouped, a group may be determined on the basis of a predetermined condition, and a preferable mapping pattern may be selected from among the mapping patterns included in the determined group. Hereinafter, an example of grouping the mapping patterns is described with reference to FIGS. 5A and 5B.

Figure 5A:
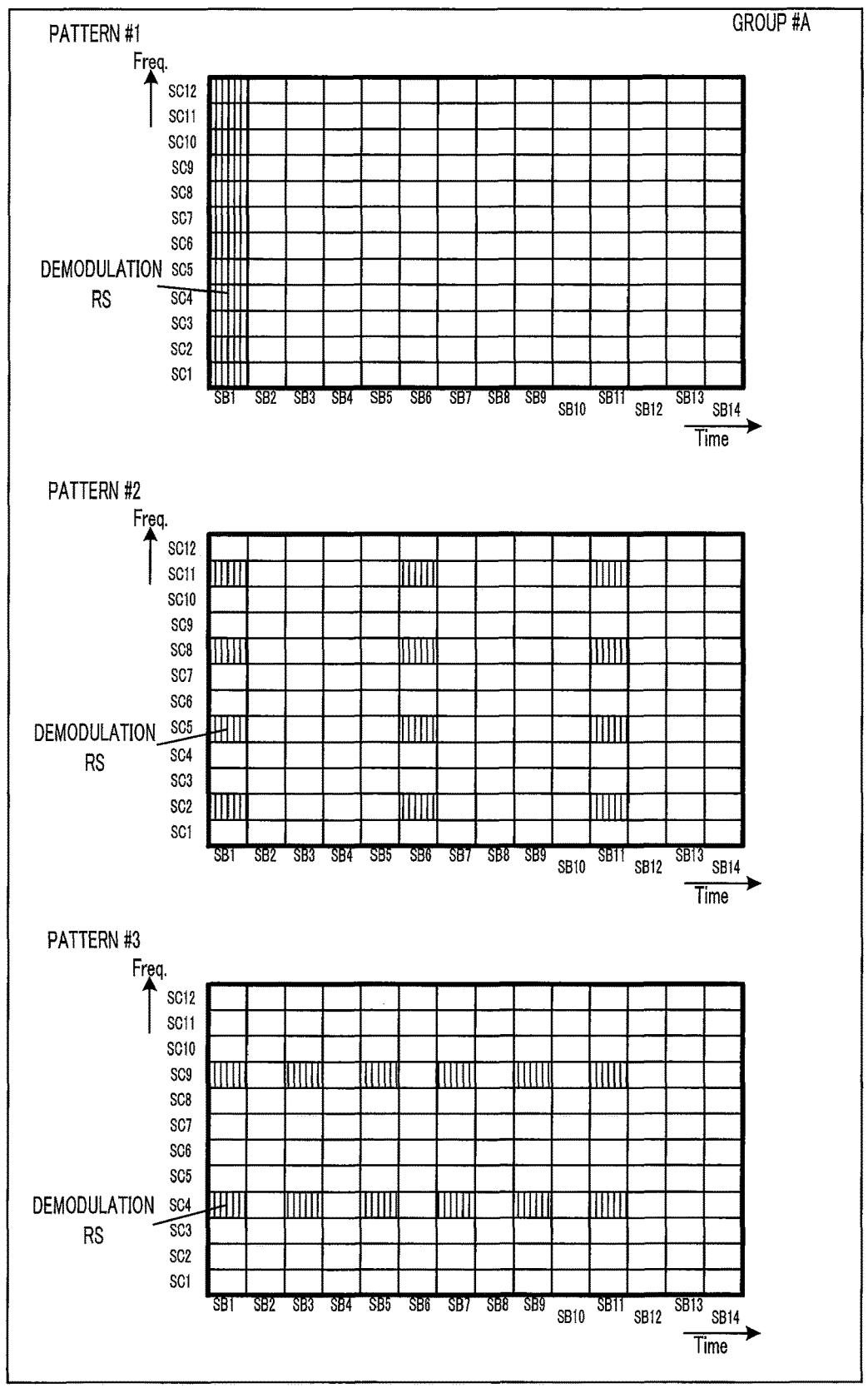
FIG. 5A illustrates an example of group #A of mapping patterns of the demodulation RS according to the one embodiment of the present invention.
Figure 5B:
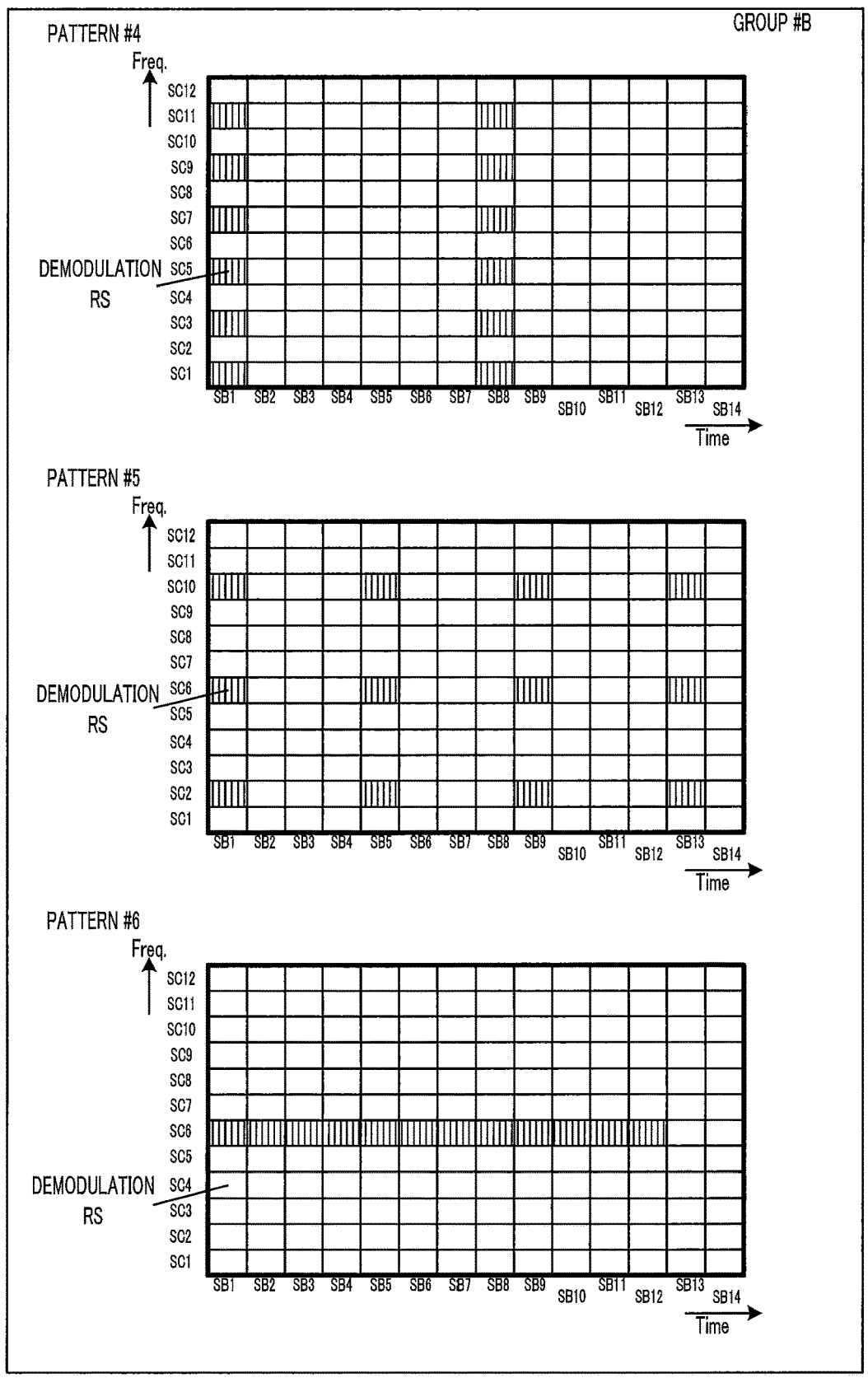
FIG. 5B illustrates an example of group #B of mapping patterns of the demodulation RS according to the one embodiment of the present invention.

FIG. 5A illustrates an example of group #A of mapping patterns of a demodulation RS according to this embodiment. FIG. 5B illustrates an example of group #B of mapping patterns of a demodulation RS according to this embodiment.

Group #A illustrated in FIG. 5A is a group including the three mapping patterns of the demodulation RS (patterns #1 to #3). Group #B illustrated in FIG. 5B is a group including the three mapping patterns of the demodulation RS (patterns #4 to #6). As with the mapping patterns illustrated in FIG. 4, each of the mapping patterns in FIGS. 5A and 5B illustrates the mapping position of the demodulation RS in RU. The definitions of RU and RE are analogous to those in FIG. 4. Accordingly, the detailed description thereof is omitted.

Patterns #1 to #3 are analogous to patterns #1 to #3 illustrated in FIG. 4. Accordingly, the details description thereof is omitted.

Pattern #4 is a pattern that maps the demodulation RS to REs corresponding to SC1, SC3, SC5, SC7, SC9 and SC11 on SB1 and SB8.

Pattern #5 is a pattern that maps the demodulation RS to REs corresponding to SC2, SC6 and SC10 on SB1, SB5, SB9 and SB13.

Pattern #6 is a pattern that maps the demodulation RS to REs corresponding to SC6 on SB1 to SB12.

In comparison with pattern #1, pattern #4 is a pattern that maps the demodulation RS densely in the temporal direction. In comparison with pattern #2, pattern #5 is a pattern that maps the demodulation RS densely in the temporal direction. In comparison with pattern #3, pattern #6 is a pattern that maps the demodulation RS densely in the temporal direction. In other words, in comparison with group #A, group #B is a group including patterns where the demodulation RS is mapped densely in the temporal direction. Each pattern is compared in an analogous manner. In comparison with group #B, group #A is a group including patterns where the demodulation RS is mapped densely in the frequency direction.

For example, the radio base station may have a configuration that determines group #A or group #B on the basis of the predetermined condition, and selects a preferable mapping pattern from among the mapping pattern candidates included in the determined group.

Hereinafter, the condition for selecting a group, and the method of selecting the mapping pattern on the basis of the condition are exemplified and described.

For example, the condition for selecting a group may be the carrier frequency. The higher the carrier frequency is, the higher the Doppler frequency is. Accordingly, it is difficult to follow the temporal variation in channel. Consequently, if the carrier frequency is high, group #B including the patterns where the demodulation RS is mapped densely in the temporal direction is selected. Specifically, if the carrier frequency is 6 GHz, group #A is selected. If the carrier frequency is 30 GHz, group #B is selected. One mapping pattern is then selected in the selected group.

The group is not necessarily selected according to the carrier frequency. Alternatively, the mapping pattern may be uniquely selected. For example, if the carrier frequency is 6 GHz, pattern #1 in group #A may be selected. If the carrier frequency is 30 GHz, pattern #4 in group #B may be selected. Unique selection of the mapping pattern for the carrier frequency, in turn, selects the common mapping pattern for each carrier frequency.

According to another example, the condition for selecting a group may be the subcarrier interval. The wider the subcarrier interval is, the further the resistance to the channel frequency selectivity is degraded. Consequently, if the subcarrier interval is wide, group #A including the patterns where the demodulation RS is mapped densely in the frequency direction is selected. Specifically, if the subcarrier interval is 60 kHz, group #A is selected. If the subcarrier interval is 15 kHz, group #B is selected. One mapping pattern is then selected in the selected group.

The group is not necessarily selected according to the subcarrier interval. Alternatively, the mapping pattern may be uniquely selected according to the subcarrier interval. For example, if the subcarrier interval is 60 kHz, pattern #1 in group #A may be selected. If the subcarrier interval is 15 kHz, pattern #4 in group #B may be selected. In the method of uniquely selecting the mapping pattern for the subcarrier interval, the common mapping pattern is selected for each subcarrier interval.

According to still another example, the condition for selecting a group may be the movement speed of the user terminal. The higher the movement speed is, the higher the Doppler frequency is. Accordingly, it is difficult to follow the temporal variation in channel. Accordingly, in a case of a user terminal capable of moving at high speed, group #B including the patterns where the demodulation RS is mapped densely in the temporal direction is selected. In a case of a user terminal moving at low speed, group #A is selected. One mapping pattern is then selected in the selected group.

The group is not necessarily selected according to the movement speed of the user terminal. Alternatively, the mapping pattern may be uniquely selected according to the movement speed of the user terminal. For example, in the case of the user terminal moving at low speed, pattern #1 in group #A may be selected. In the case of the user terminal capable of moving at high speed, pattern #4 in group #B may be selected. In the method of uniquely selecting the mapping pattern for the movement speed of the user terminal, mapping patterns different among the user terminals are selected.

According to yet another example, the condition for selecting a group may be the channel estimation accuracy required for the user terminal. In a case of a user terminal that requires a higher channel estimation accuracy in order to achieve highly reliable communication, a group including patterns which have a high overhead and in which the demodulation RS is mapped densely in the temporal direction and the frequency direction is selected. In a case of a user terminal that performs normal communication (for example, communication having a lower required channel estimation accuracy than the aforementioned highly reliable communication), a group including patterns having a normal overhead amount (for example, a pattern having a smaller overhead amount than the aforementioned pattern having the large overhead amount) is selected. One mapping pattern is then selected in the selected group.

The group is not necessarily selected according to the channel estimation accuracy required for the user terminal. Alternatively, the mapping pattern may be uniquely selected according to the channel estimation accuracy required for the user terminal. For example, in a case of a user terminal that requires a high channel estimation accuracy, a specific pattern in a group which has a high overhead and in which the demodulation RS is densely mapped may be selected. In a case of a user terminal that performs normal communication, a specific pattern in a group having a normal overhead amount may be selected. In the method of uniquely selecting the mapping pattern for the channel estimation accuracy required for the user terminal, mapping patterns different among the user terminals are selected.

According to still another example, the condition for selecting a group may be the latency time required for the user terminal. In a case of a user terminal that requires communication having a low latency, a group including patterns where the demodulation RS is mapped forward in the subframe is selected. In a case of a user terminal that performs normal communication (for example, communication having a larger allowable latency time than the aforementioned communication having low latency), a group including a pattern without consideration of the latency time (a pattern where the demodulation RS is also mapped rearward in the subframe) is selected. One mapping pattern is then selected in the selected group.

The group is not necessarily selected according to the latency time required for the user terminal. Alternatively, the mapping pattern may be uniquely selected according to the latency time required for the user terminal. For example, in a case of a user terminal that requires communication having low latency, a specific pattern in a group where the demodulation RS is mapped forward in the subframe may be selected. In a case of a user terminal that performs normal communication, a specific pattern in a group without consideration of the latency time may be selected. Unique selection of the mapping pattern for the latency time required for the user terminal, in turn, selects mapping patterns different among the user terminals.

The mapping pattern or the group including mapping patterns may be common in the cell. For example, in a case where the subcarrier interval defined in the cell is wide (for example, 60 kHz), group #A is selected as the group common in the cell. Alternatively, in a case where the cell covers an area containing more user terminals moving at high speed (for example, an area along a bullet train (Shinkansen)), group #B is selected as the group common in the cell.

The radio base station may have a configuration that determines group #A or group #B on the basis of the predetermined condition, and selects a preferable mapping pattern from among the mapping patterns included in the determined group. According to such a configuration, the conditions can be respectively defined for selecting the group and for selecting the mapping pattern in the group. Consequently, the design flexibility for the mapping pattern selecting method can be improved. When the user terminal uses the method of preliminarily obtaining information relating to the selected group from the radio base station through signaling and/or the like or the user terminal uses the method of estimating the selected group on the basis of the information known to the user terminal (for example, the carrier frequency, the subcarrier interval, and the movement speed of the user terminal), it is possible to reduce the overhead of signaling for the information relating to the mapping pattern.

Although not limited to the example described above, the present invention may define the common mapping pattern for each carrier frequency and for each subcarrier interval, or define different mapping patterns. Alternatively, the mapping pattern common in the cell may be defined, or mapping patterns different among the user terminals may be defined. Further alternatively, the mapping patterns different among the cells may be defined.

FIGS. 5A and 5B illustrate two groups each including three mapping patterns. However, the present invention is not limited to this. The number of groups may be three or more. The number of mapping patterns in the group may be two or less, or four or more. Alternatively, the number of mapping patterns may be different among the groups.

In the mapping pattern of the demodulation RS described above, the position of the RE to which the demodulation RS is mapped, and the position of the RE to which another signal is mapped sometimes overlap with each other. Change in demodulation RS mapping in case of occurrence of such overlapping is described with reference to FIG. 6.

Figure 6:
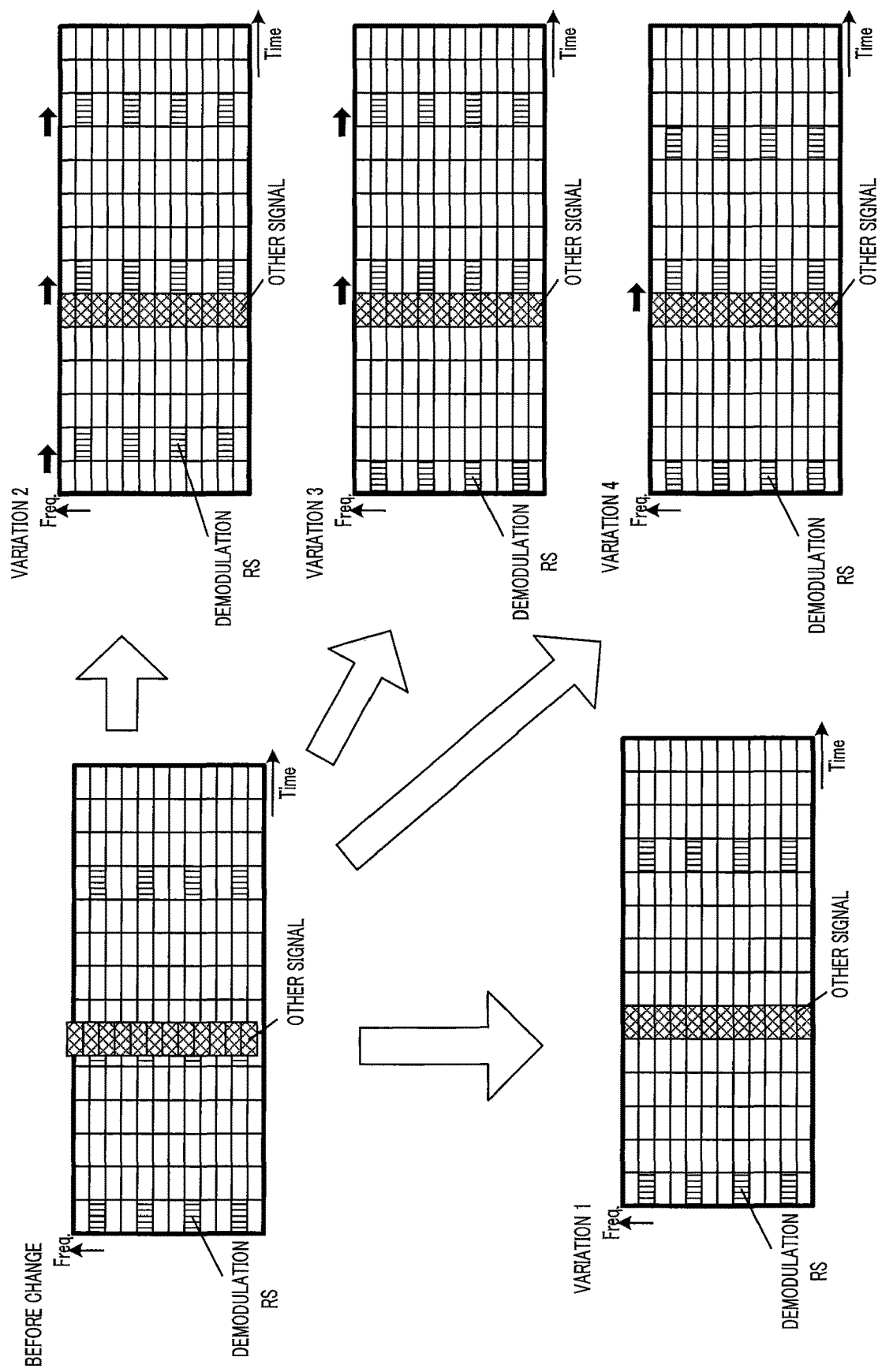
FIG. 6 illustrates an example of overlapping with another signal in mapping patterns of the demodulation RS according to the one embodiment of the present invention.
Figure 7A:
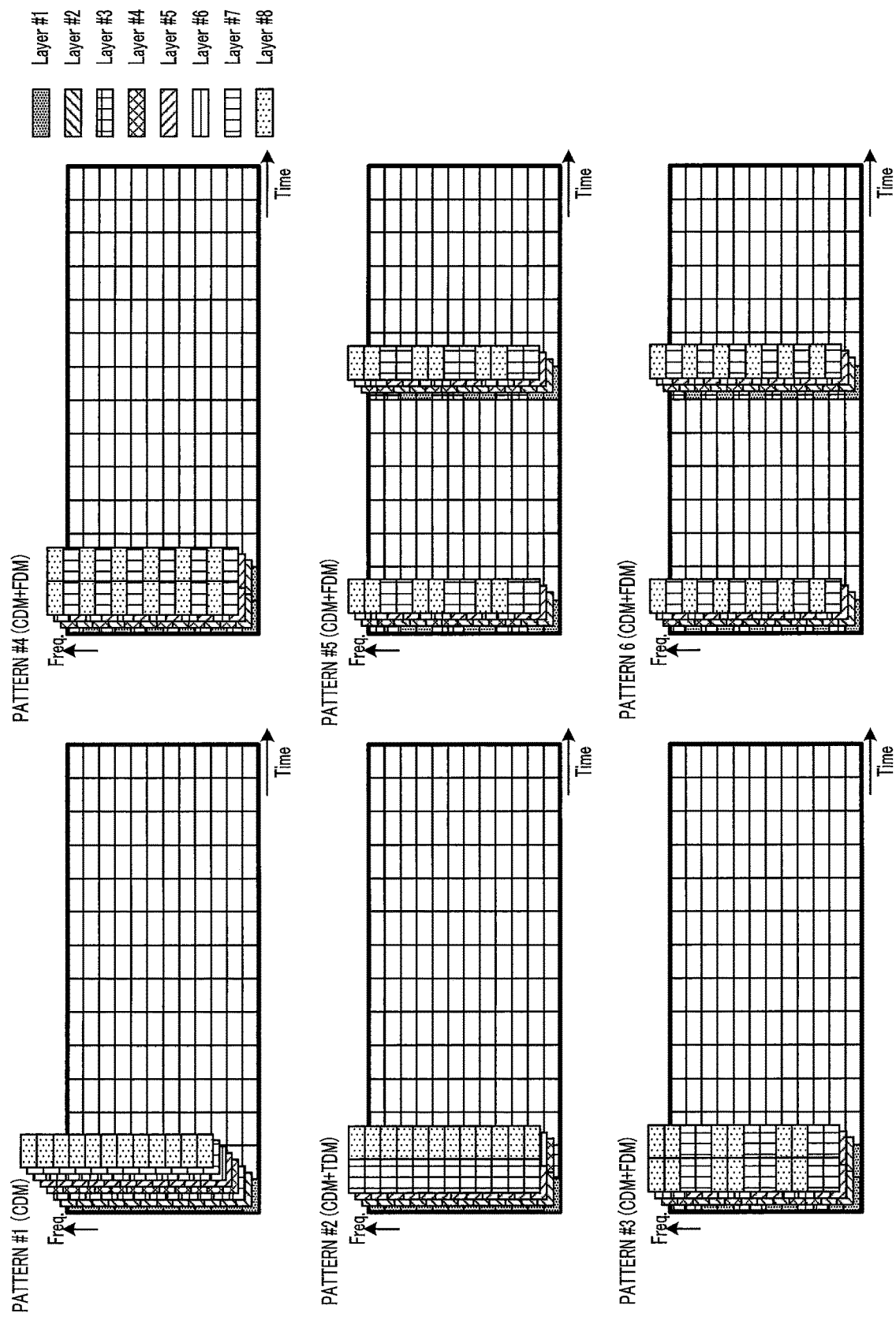
FIG. 7A illustrates an example of mapping the demodulation RS for multiple layers according to Modification Example 1 of the one embodiment of the present invention.
Figure 7B:
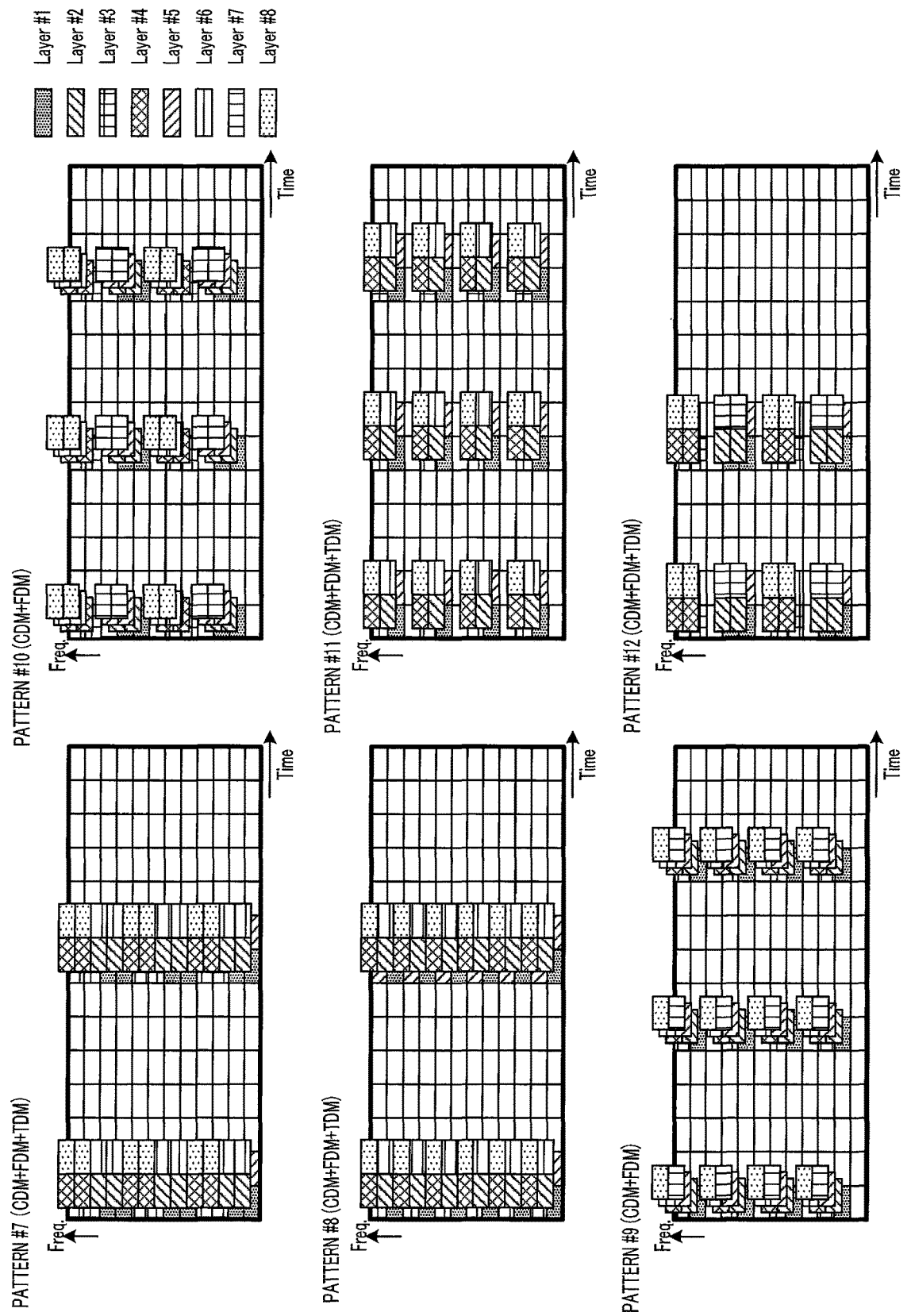
FIG. 7B illustrates an example of mapping the demodulation RS for multiple layers according to Modification Example 1 of the one embodiment of the present invention.
Figure 7C:
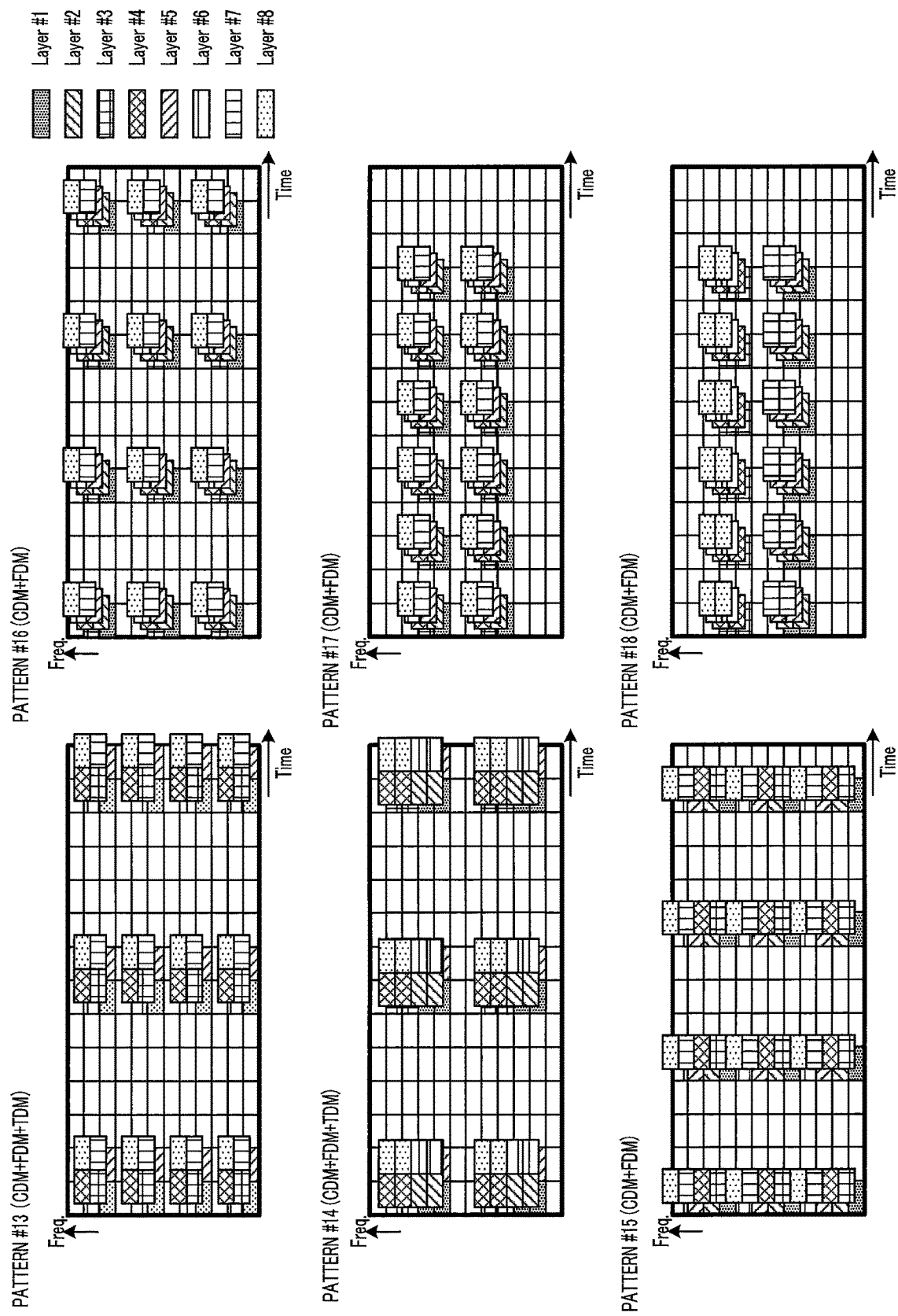
FIG. 7C illustrates an example of mapping the demodulation RS for multiple layers according to Modification Example 1 of the one embodiment of the present invention.
Figure 7D:
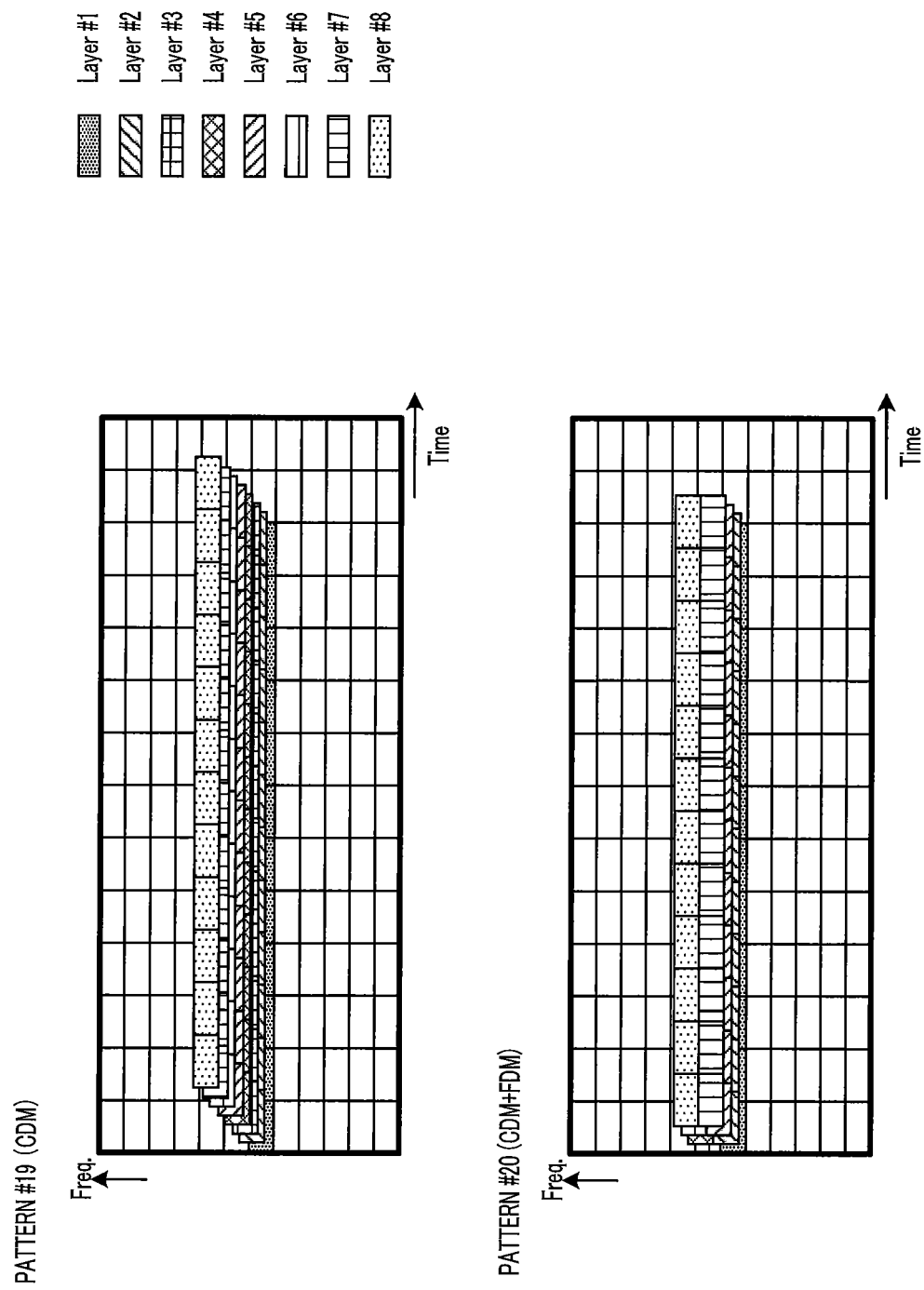
FIG. 7D illustrates an example of mapping the demodulation RS for multiple layers according to Modification Example 1 of the one embodiment of the present invention.

FIG. 6 illustrates an example of overlapping with another signal in mapping patterns of the demodulation RS according to this embodiment. FIG. 6 illustrates the mapping pattern and the other signal mapped to the RE including the position of RE to which the demodulation RS is mapped, as illustration before change of mapping. FIG. 6 further illustrates variations 1 to 4 after change of mapping.

Variation 1 is an example of mapping the other signal but not mapping the demodulation RS at the position of RE (hereinafter called an overlapping RE) where the position of RE to which the demodulation RS is mapped overlaps with the position of RE to which the other signal is mapped.

Variation 2 is an example of mapping the other signal to the overlapping RE and of shifting rearward, by one symbol, all the demodulation RSs including the demodulation RS originally defined to be mapped to the overlapping RE.

Variation 3 is an example of mapping the other signal to the overlapping RE and of shifting rearward, by one symbol, the demodulation RS originally defined to be mapped to the overlapping RE and the demodulation RSs after this demodulation RS.

Variation 4 is an example of mapping the other signal to the overlapping RE and of shifting rearward, by one symbol, the demodulation RS originally defined to be mapped to the overlapping RE.

In a case where the position of RE to which the demodulation RS is mapped overlaps with the position of RE to which the other signal is mapped, the demodulation RSs and the other signal can be preferably mapped by performing any of the changes of variations 1 to 4 described above.

Variations 1 to 4 illustrated in FIG. 6 have been described assuming that the other signal is mapped to the overlapping RE with priority. However, the present invention is not limited to this. Alternatively, the demodulation RS may be mapped to the overlapping RE with priority. In this case, the other signal originally defined to be mapped to the overlapping RE may be configured not to be mapped, or the other signal may be shifted.

Variations 2 to 4 illustrated in FIG. 6 have been described assuming that the direction of shifting the demodulation RS is more rearward than the position defined by the mapping pattern, and the amount of shifting the demodulation RS is one symbol. However, the present invention is not limited to this. For example, the direction of shifting the demodulation RS may be more forward than the position defined by the mapping pattern. The shifting amount may be two symbols or more.

Different rules may be applied to individual demodulation RSs including the demodulation RS originally defined to be mapped to the overlapping RE. For example, it may be configured that among the demodulation RSs originally defined to be mapped to the overlapping RE, some demodulation RSs are determined not to be mapped but some other demodulation RSs are determined to be shifted. The shifting direction and the shifting amount may be different among the individual demodulation RSs.

With reference to FIG. 6, the example has been described where the other signal is uniformly mapped in the frequency direction at a specific symbol while the demodulation RS is shifted in the temporal direction to avoid overlapping with the other signal. However, the present invention is not limited to this. The shifting direction may be the frequency direction. For example, in a case where the other signal is mapped uniformly in the temporal direction at a specific subcarrier, the demodulation RS may be shifted in the frequency direction to avoid overlapping between the other signal and the demodulation RS. Furthermore, the direction is not limited to a single direction. The signal may be shifted in both the temporal direction and the frequency direction instead.

Advantageous Effects of this Embodiment

In this embodiment, the demodulation RS is mapped on the basis of one mapping pattern selected from among the predefined mapping pattern candidates. At this time, the mapping pattern is selected in consideration of various conditions including the carrier frequency, the subcarrier interval, the requirement of the terminal, and the channel situations. Accordingly, the configuration (for example, mapping) of the DL reference signal (for example, a demodulation RS) can be realized that is suitable to a future radio communication system assumed to support a wide frequency band ranging from a low frequency band to a high frequency band and to introduce different numerologies.

Modification Example 1 of One Embodiment

In the aforementioned embodiment, the example without any specific limitation to the number of demodulation RS layers has been described. In Modification Example 1 of this embodiment to be described below, mapping patterns in a case of mapping the demodulation RS to multiple layers are described with reference to FIGS. 7A to 7D.

FIGS. 7A to 7D illustrate examples of mapping the demodulation RS for multiple layers according to Modification Example 1 of this embodiment. The examples illustrated in FIGS. 7A to 7D are examples where the maximum number of demodulation RS layers is eight. A maximum number of symbols to which the demodulation RS is mapped is configured by RRC signaling.

Patterns #1 and #19 in FIGS. 7A to 7D are patterns of multiplexing the demodulation RS for each layer by applying code division multiplexing (CDM). Patterns #2 to #18 and #20 are patterns of multiplexing the demodulation RS for each layer by a combination of code division multiplexing (CDM), and time division multiplexing (TDM) and/or frequency division multiplexing (FDM). The mapping patterns illustrated in Patterns #1 to #20 have layer multiplexing methods different from each other.

In Patterns #1 to #20, the smaller the number of CDM-applied multiplexes is, the shorter the code length for CDM can be configured. Accordingly, the patterns are applicable even to cases having a large channel variation. The narrower the mapping interval of the demodulation RS in the frequency direction is, the higher the resistance to the channel frequency selectivity is. The narrower the mapping interval of the demodulation RS in the temporal direction is, the further the property of tracking the temporal variation in channel can be improved. The more the number of demodulation RS mappings in the frequency direction at the same symbol is, the further the power boost can be achieved. In the case of patterns of multiplexing the demodulation RS for each layer by applying CDM as with patterns #1 and #19, the number of REs to which the demodulation RS is mapped is smaller than that of the other patterns. Accordingly, it is possible to reduce the overhead.

Patterns #1 to #20 illustrate the examples where the numbers of demodulation RSs for each layer are identical to each other. However, the present invention is not limited to this. The numbers of demodulation RSs for each layer may be different from each other.

Patterns #1 to #20 illustrate the examples of application of CDM. Instead of CDM, space division multiplexing (SDM) may be applied. SDM may be combined with TDM and/or FDM to achieve multiplexing.

Modification Example 2 of One Embodiment

In Modification Example 2 of this embodiment described below, examples of a variation of the mapping pattern with respect to a difference in the number of layers, and a variation of the mapping pattern with respect to a difference in the number of REs to which the demodulation RS is mapped in one resource unit (RU) (also called a resource block, a resource block pair and/or the like).

Figure 8:
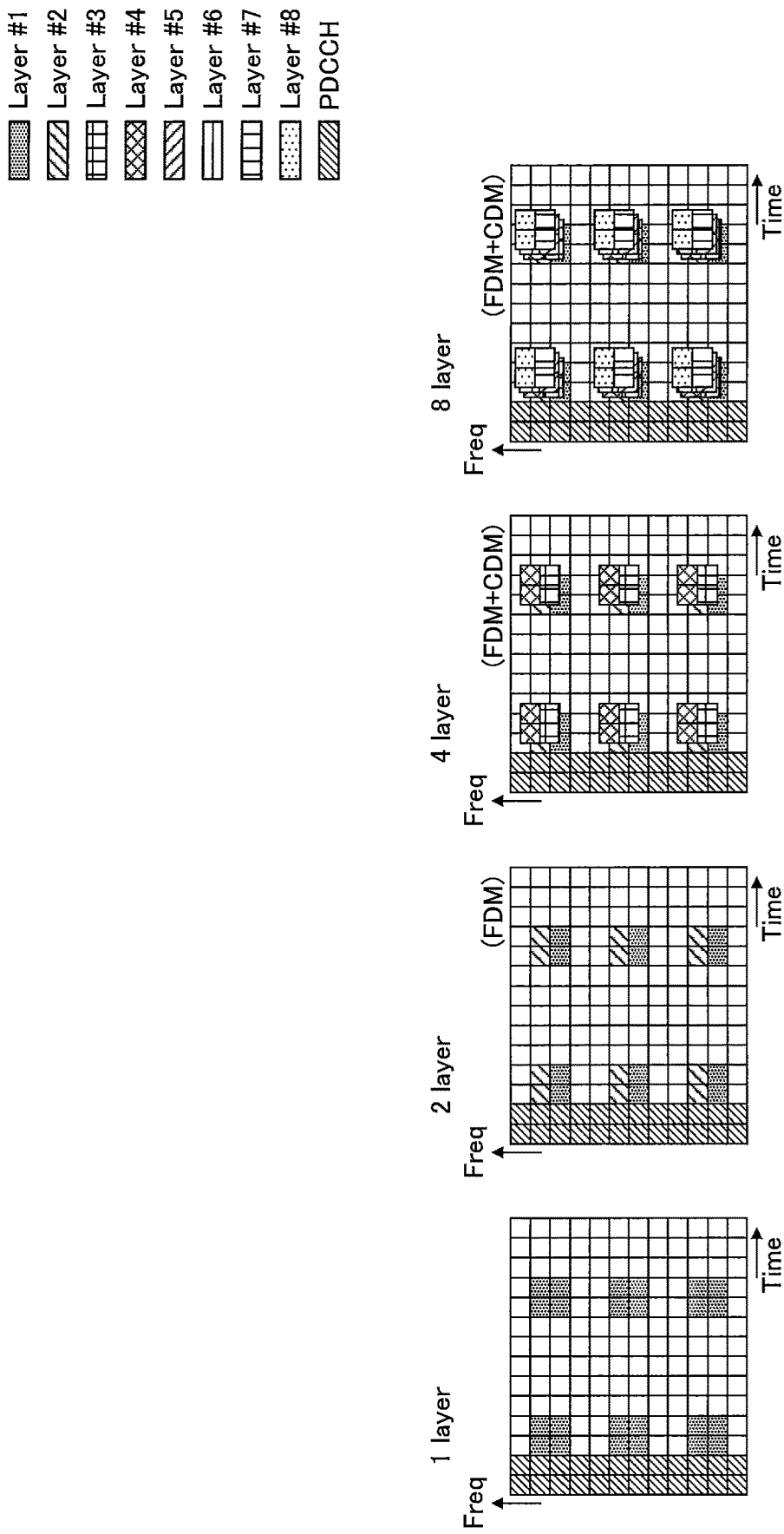
FIG. 8 illustrates a first example of mapping of the demodulation RS according to Modification Example 2 of the one embodiment of the present invention.

FIG. 8 illustrates a first example of the mapping of the demodulation RS according to Modification Example 2 of this embodiment. The example illustrated in FIG. 8 is an example of mapping where the number of REs to which the demodulation RS is mapped in one RU is 24. In the example illustrated in FIG. 8, a control signal channel (for example, PDCCH) is mapped to RE for the beginning two symbols. A method of shifting the demodulation RS as described with reference to FIG. 6 may be applied to the example illustrated in FIG. 8.

FIG. 8 illustrates a mapping pattern with the number of layers being one (1 layer), a mapping pattern with the number of layers being two (2 layers), a mapping pattern with the number of layers being four (4 layers), and a mapping pattern with the number of layers being eight (8 layers). In the mapping pattern with the number of layers being 2, the demodulation RS is multiplexed by applying FDM. In the mapping pattern with the number of layers being four and the mapping pattern with the number of layers being eight, the demodulation RS is multiplexed by applying FDM and CDM.

In each mapping pattern illustrated in FIG. 8, multiple demodulation RSs are mapped at intervals both in the frequency direction and the temporal direction. Accordingly, the mapping pattern illustrated in FIG. 8 is a pattern that can support the temporal variation in channel and the channel frequency selectivity in a balanced manner. In comparison with the data channel, the number of multiplexed layers in the identical RE decreases. Consequently, the power boost can be achieved.

Figure 9:
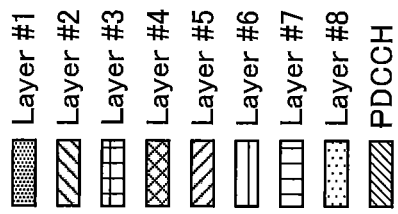
FIG. 9 illustrates a second example of mapping of the demodulation RS according to Modification Example 2 of the one embodiment of the present invention.
Figure 9:
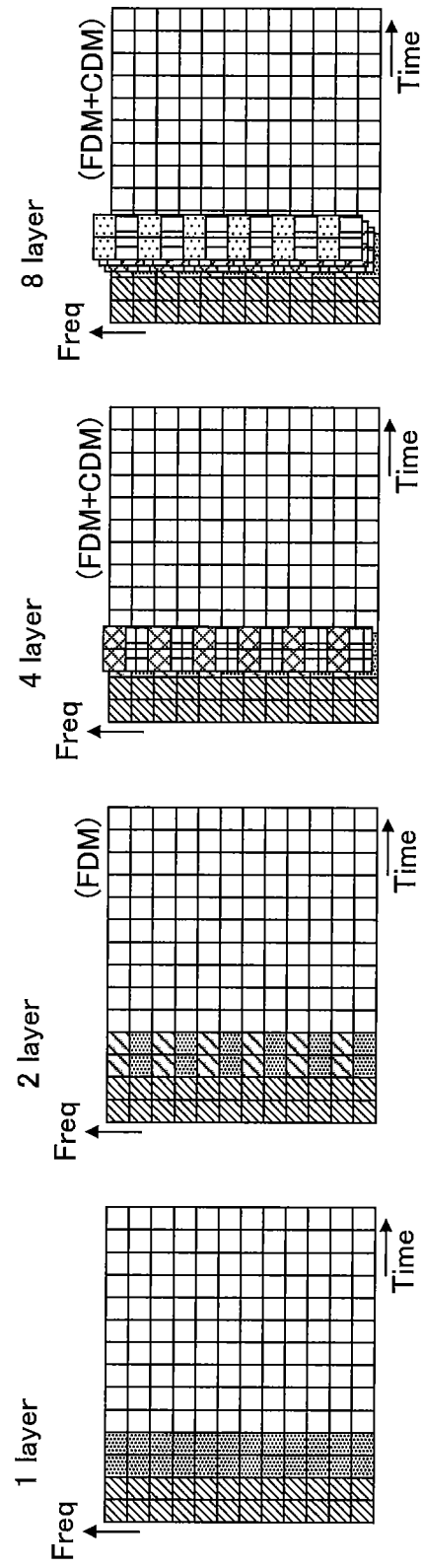

FIG. 9 illustrates a second example of the mapping of the demodulation RS according to Modification Example 2 of this embodiment. As with FIG. 8, the example illustrated in FIG. 9 is an example of mapping where the number of REs to which the demodulation RS is mapped in one RU is 24. In the example illustrated in FIG. 9, the control signal channel (for example, PDCCH) is mapped to RE for the beginning two symbols. A method of shifting the demodulation RS as described with reference to FIG. 6 may be applied to the example illustrated in FIG. 8.

FIG. 9 illustrates a mapping pattern with the number of layers being one (1 layer), a mapping pattern with the number of layers being two (2 layers), a mapping pattern with the number of layers being four (4 layers), and a mapping pattern with the number of layers being eight (8 layers). In the mapping pattern with the number of layers being 2, the demodulation RS is multiplexed by applying FDM. In the mapping pattern with the number of layers being four and the mapping pattern with the number of layers being eight, the demodulation RS is multiplexed by applying FDM and CDM.

According to each mapping pattern illustrated in FIG. 9, the demodulation RS is mapped densely in the frequency direction. Accordingly, each mapping pattern illustrated in FIG. 9 is a pattern having high resistance to the channel frequency selectivity. In comparison with the data channel, the number of multiplexed layers in the identical RE decreases. Consequently, the power boost can be achieved.

In a case where a temporal variation in channel occurs, the demodulation RS may be added to each mapping pattern illustrated in FIG. 9. Hereinafter, the added demodulation RS is called an additional DMRS.

FIGS. 10A to 10D illustrate examples of the mapping patterns of the additional DMRSs added to the mapping patterns illustrated in FIG. 9. In the examples illustrated in FIGS. 10A to 10D, the control signal channel (for example, PDCCH) is mapped to RE for the beginning two symbols.

In FIGS. 10A to 10D, the mapping patterns of the additional DMRSs respectively for the mapping pattern with the number of layers being one illustrated in FIG. 9, the mapping pattern with the number of layers being two illustrated in FIG. 9, and the mapping pattern with the number of layers being four illustrated in FIG. 9 are arranged vertically for each number of layers.

The mapping patterns having the same number of layers illustrated in FIGS. 10A to 10D are different from the other mapping patterns, in at least one of the number of additional DMRSs, the subcarrier to be mapped, and the symbol to be mapped.

Figure 10A:
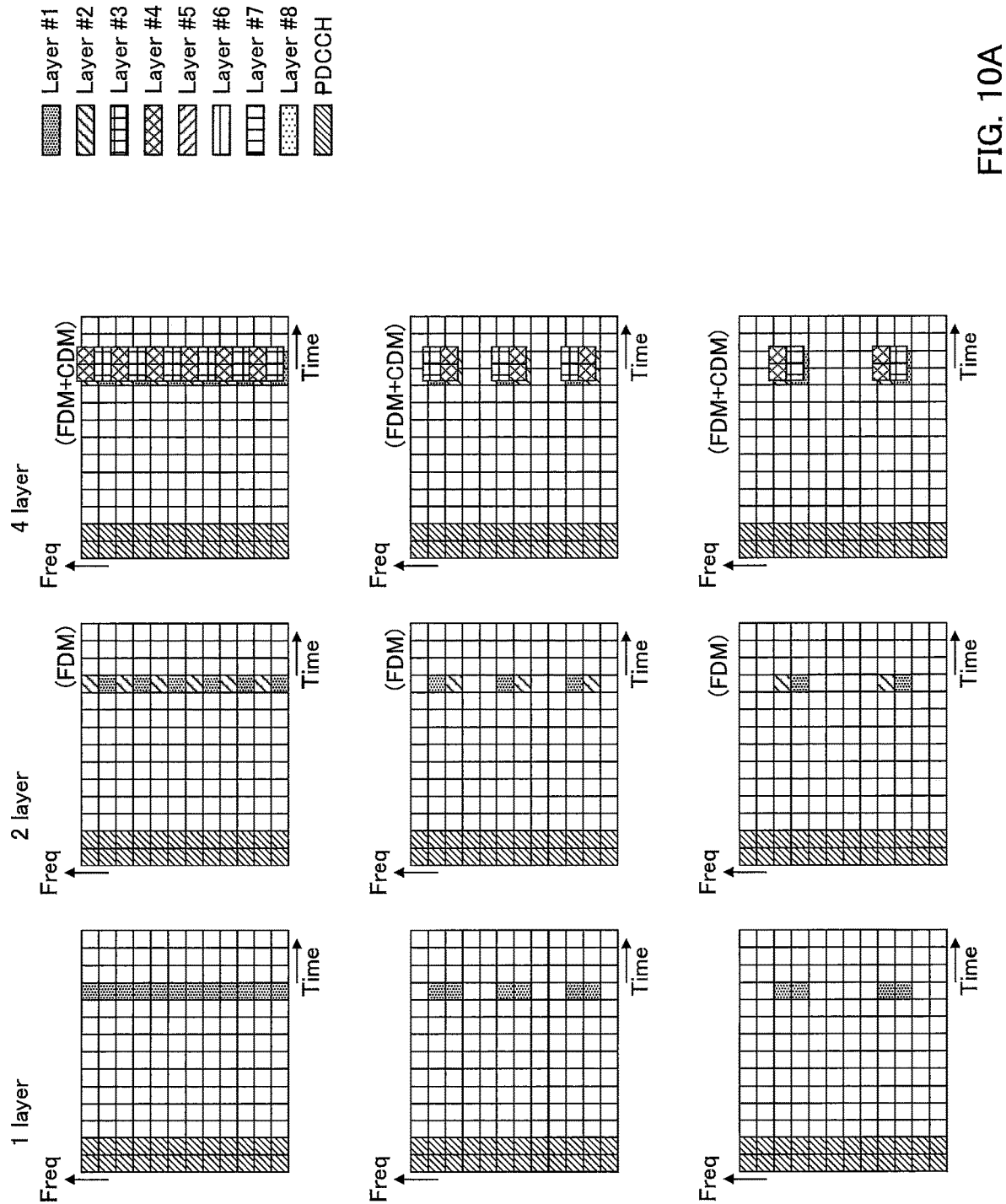
FIG. 10A illustrates an example of a mapping pattern of an additional DMRS added to the mapping patterns illustrated in FIG. 9.
Figure 10B:
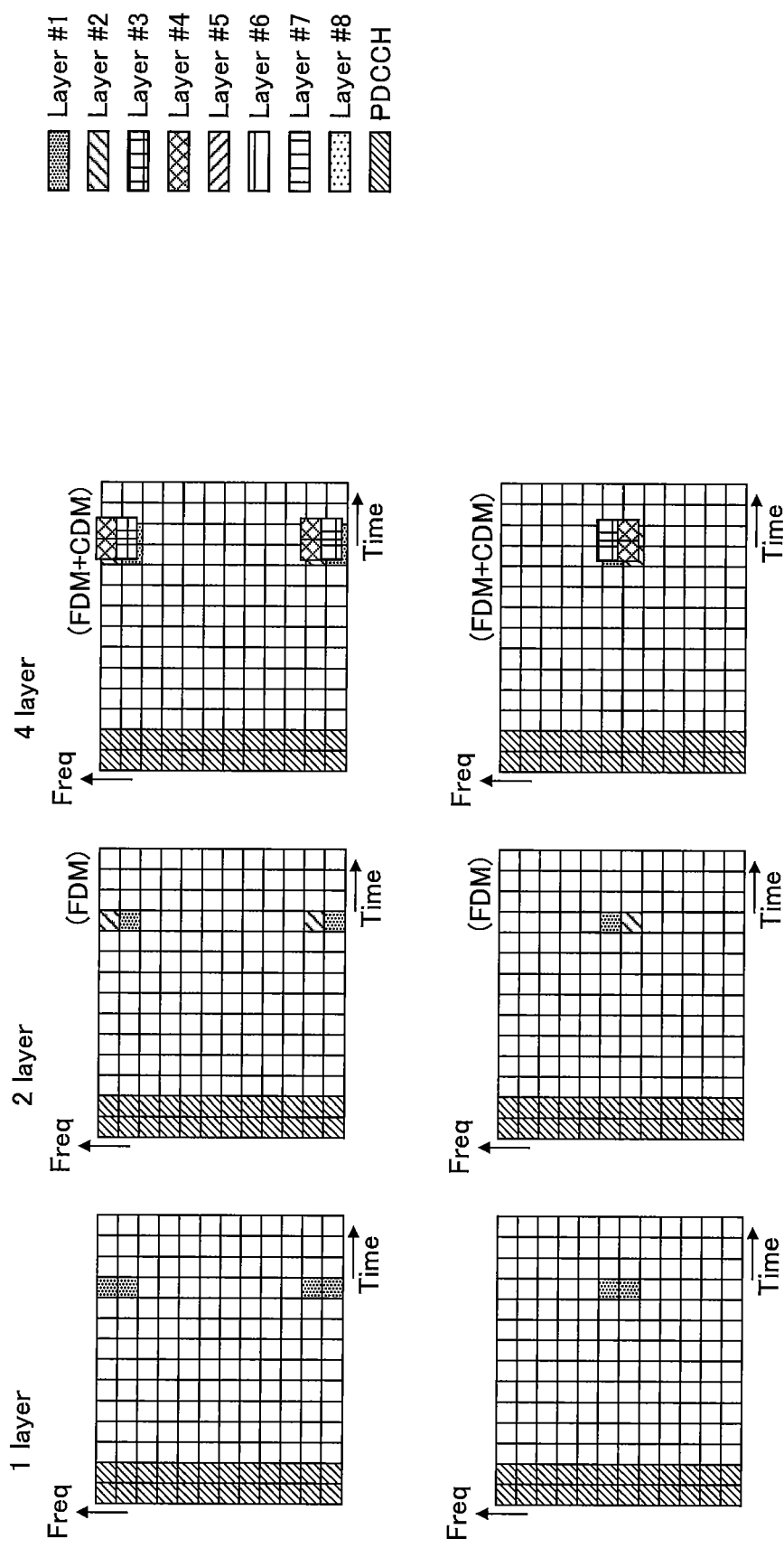
FIG. 10B illustrates an example of the mapping pattern of the additional DMRS added to the mapping patterns illustrated in FIG. 9.
Figure 10C:
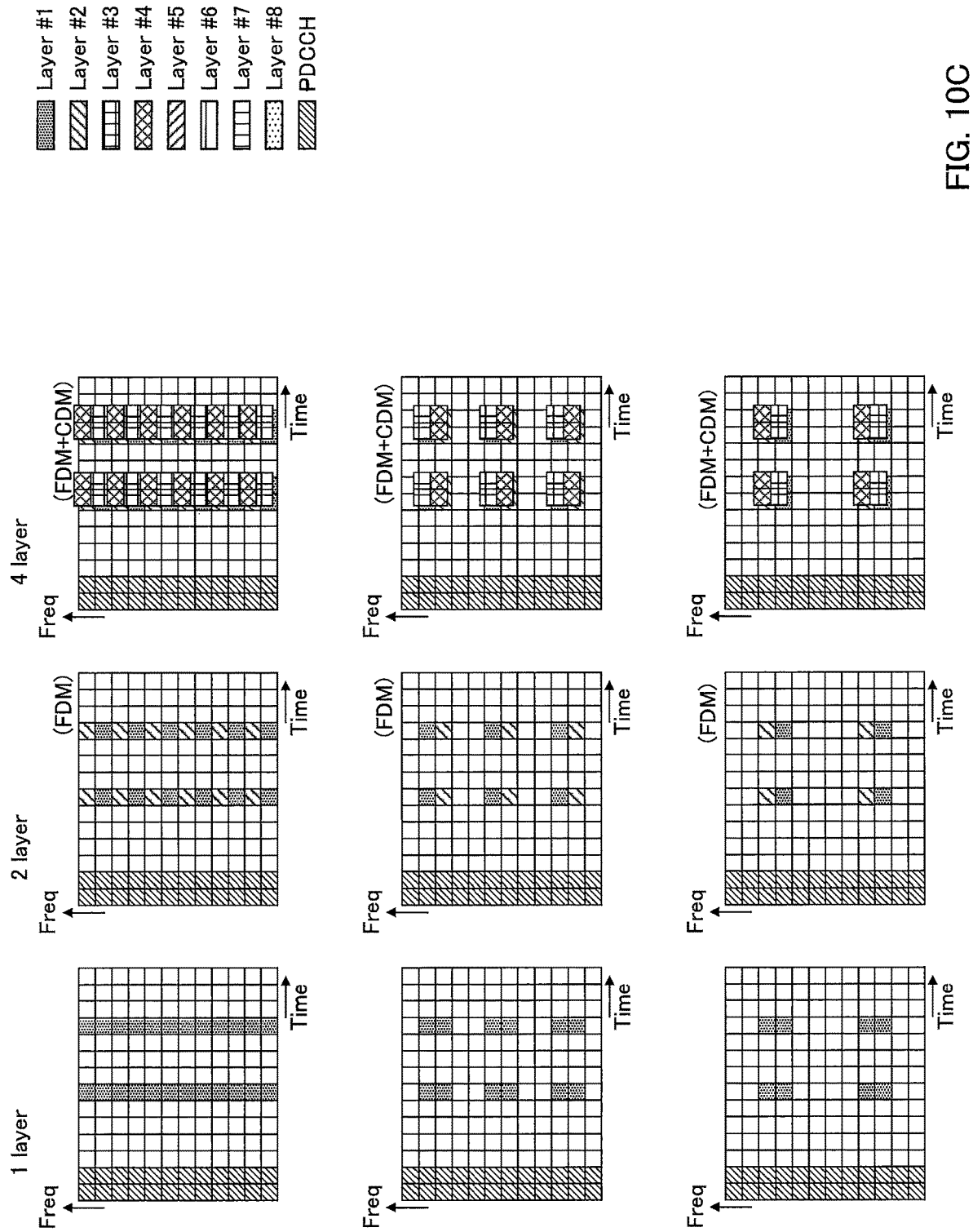
FIG. 10C illustrates an example of the mapping pattern of the additional DMRS added to the mapping patterns illustrated in FIG. 9.
Figure 10D:
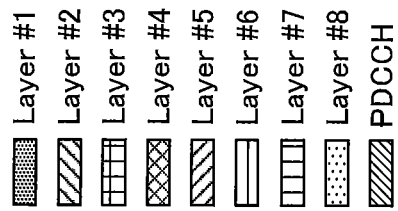
FIG. 10D illustrates an example of the mapping pattern of the additional DMRS added to the mapping patterns illustrated in FIG. 9.
Figure 10D:
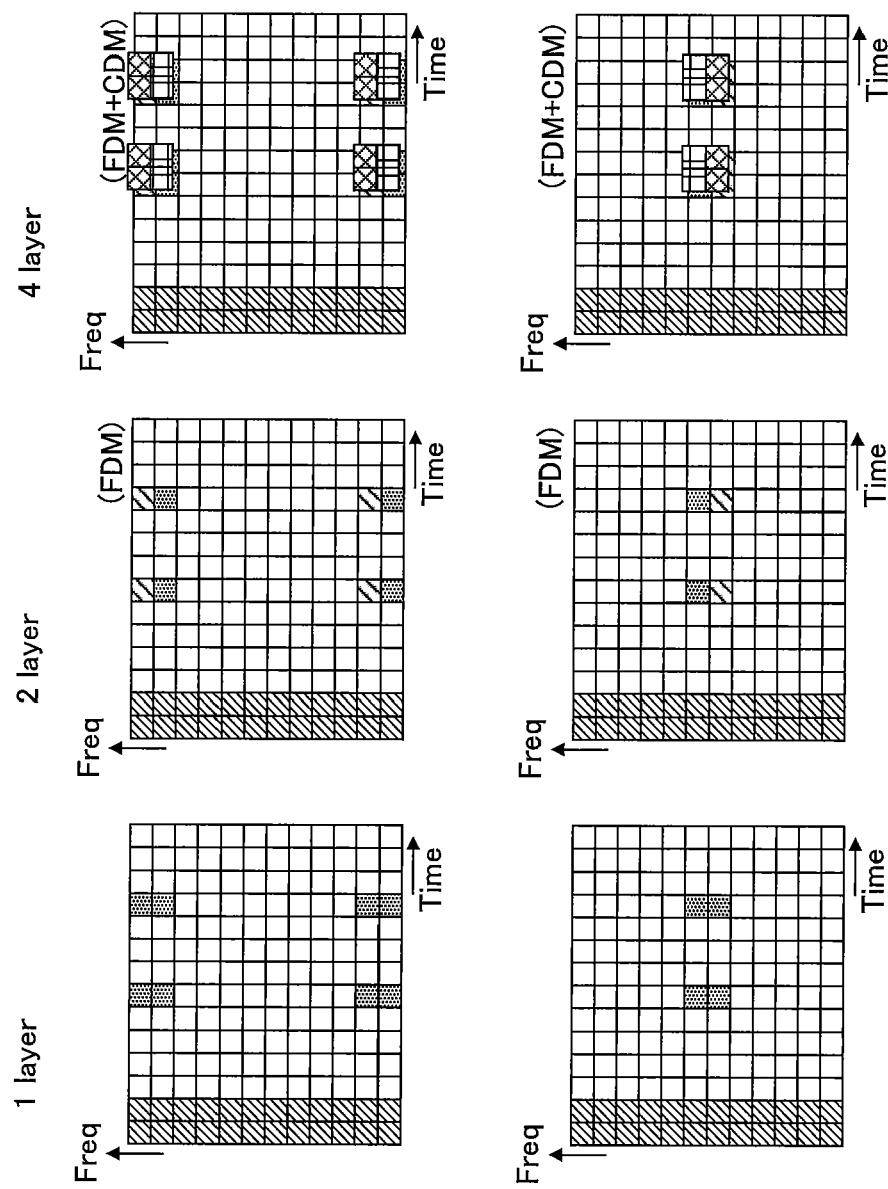

For example, according to the mapping patterns illustrated in FIGS. 10A and 10B, the additional DMRS is mapped to RE for one symbol. According to the mapping patterns illustrated in FIGS. 10C and 10D, the additional DMRSs are mapped at intervals with three symbols in the temporal direction.

According to the mapping pattern with the number of layers being four, the demodulation RS is multiplexed by applying CDM. Consequently, the additional DMRS is mapped to RE for two symbols that are consecutive in the temporal direction.

The property of tracking the temporal variation in channel can be improved by adding any of the additional DMRSs of the mapping patterns illustrated in FIGS. 10A to 10D to the mapping patterns illustrated in FIG. 9.

For example, when the radio base station or the user terminal using the mapping pattern of the demodulation RS illustrated in FIG. 9 detects the temporal variation in channel, any of the mapping patterns of the additional DMRSs illustrated in FIGS. 10A to 10D may be selected on the basis of the speed of the temporal variation and/or the position of the subcarrier where the temporal variation in channel occurs. Alternatively, the mapping pattern to be used among the mapping patterns of the additional DMRSs illustrated in FIGS. 10A to 10D may be predefined.

The mapping patterns of the additional DMRS for the mapping patterns of the demodulation RS illustrated in FIG. 9 are not limited to that in FIGS. 10A to 10D.

The additional DMRS and the demodulation RS may be symbols identical to or different from each other.

The additional DMRS is not necessarily discriminated from the additional demodulation RS or the demodulation RS.

A method of shifting the demodulation RS as described with reference to FIG. 6 may be applied.

With reference to FIGS. 8 and 9, the example of the mapping pattern has been described where the number of REs to which the demodulation RS is mapped in one RU is 24. Next, the example of the mapping pattern is described where the number of REs to which the demodulation RS is mapped in one RU is 16.

Figure 11:
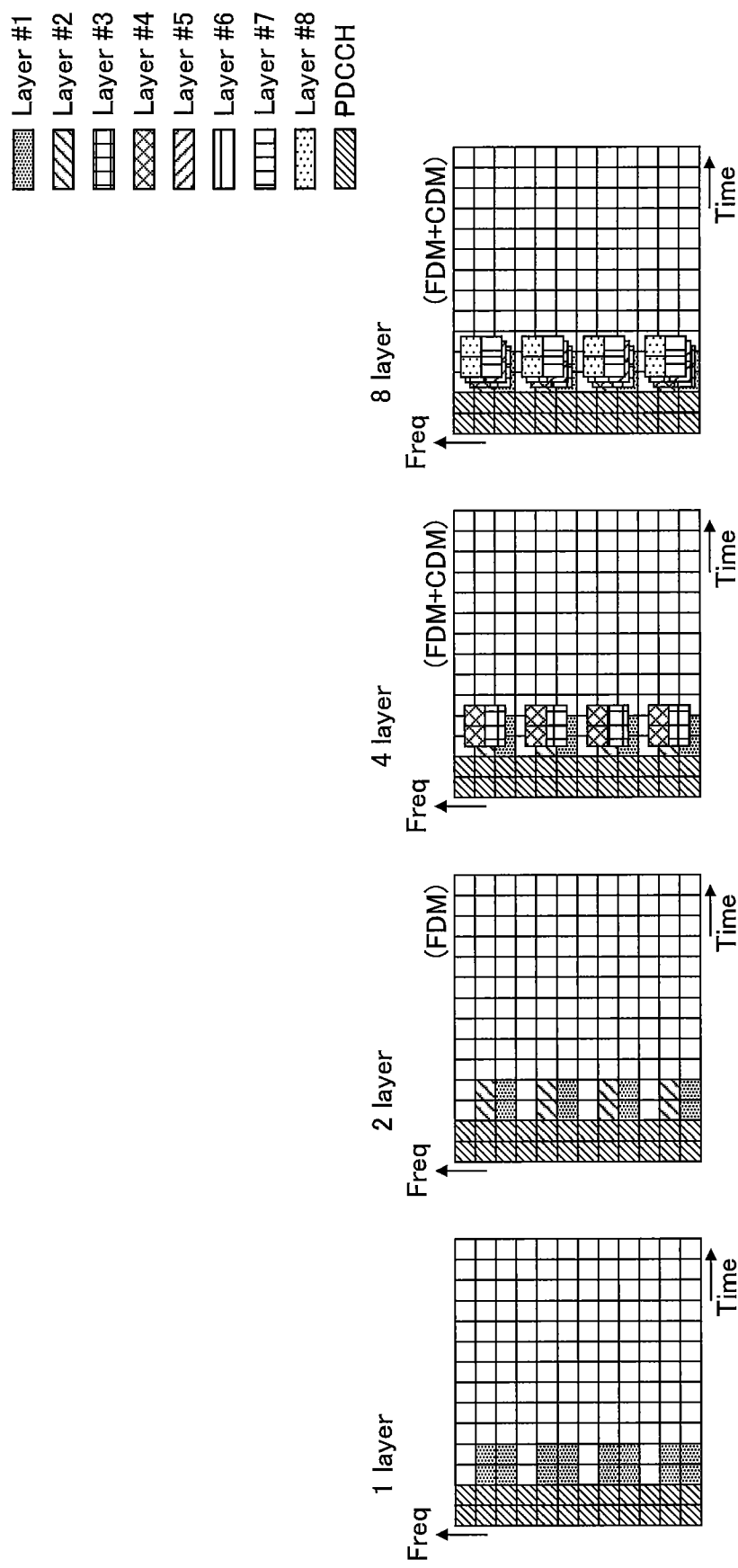
FIG. 11 illustrates a third example of mapping of the demodulation RS according to Modification Example 2 of the one embodiment of the present invention.

FIG. 11 illustrates a third example of the mapping of the demodulation RS according to Modification Example 2 of this embodiment. In the example illustrated in FIG. 11, the control signal channel (for example, PDCCH) is mapped to RE for the beginning two symbols.

FIG. 11 illustrates a mapping pattern with the number of layers being one (1 layer), a mapping pattern with the number of layers being two (2 layers), a mapping pattern with the number of layers being four (4 layers), and a mapping pattern with the number of layers being eight (8 layers). In the mapping pattern with the number of layers being two, the demodulation RS is multiplexed by applying FDM. In the mapping pattern with the number of layers being four and the mapping pattern with the number of layers being eight, the demodulation RS is multiplexed by applying FDM and CDM.

According to each mapping pattern illustrated in FIG. 11, the demodulation RS is mapped densely in the frequency direction. Accordingly, each mapping pattern illustrated in FIG. 11 is a pattern having high resistance to the channel frequency selectivity. The number of demodulation RSs is smaller than that in the mapping pattern illustrated in FIG. 10. Accordingly, it is possible to reduce the overhead. In comparison with the data channel, the number of multiplexed layers in the identical RE decreases. Consequently, the power boost can be achieved.

In a case where a temporal variation in channel occurs, the additional DMRS may be added to each mapping pattern illustrated in FIG. 11, as with the example in FIG. 9.

Figure 12A:
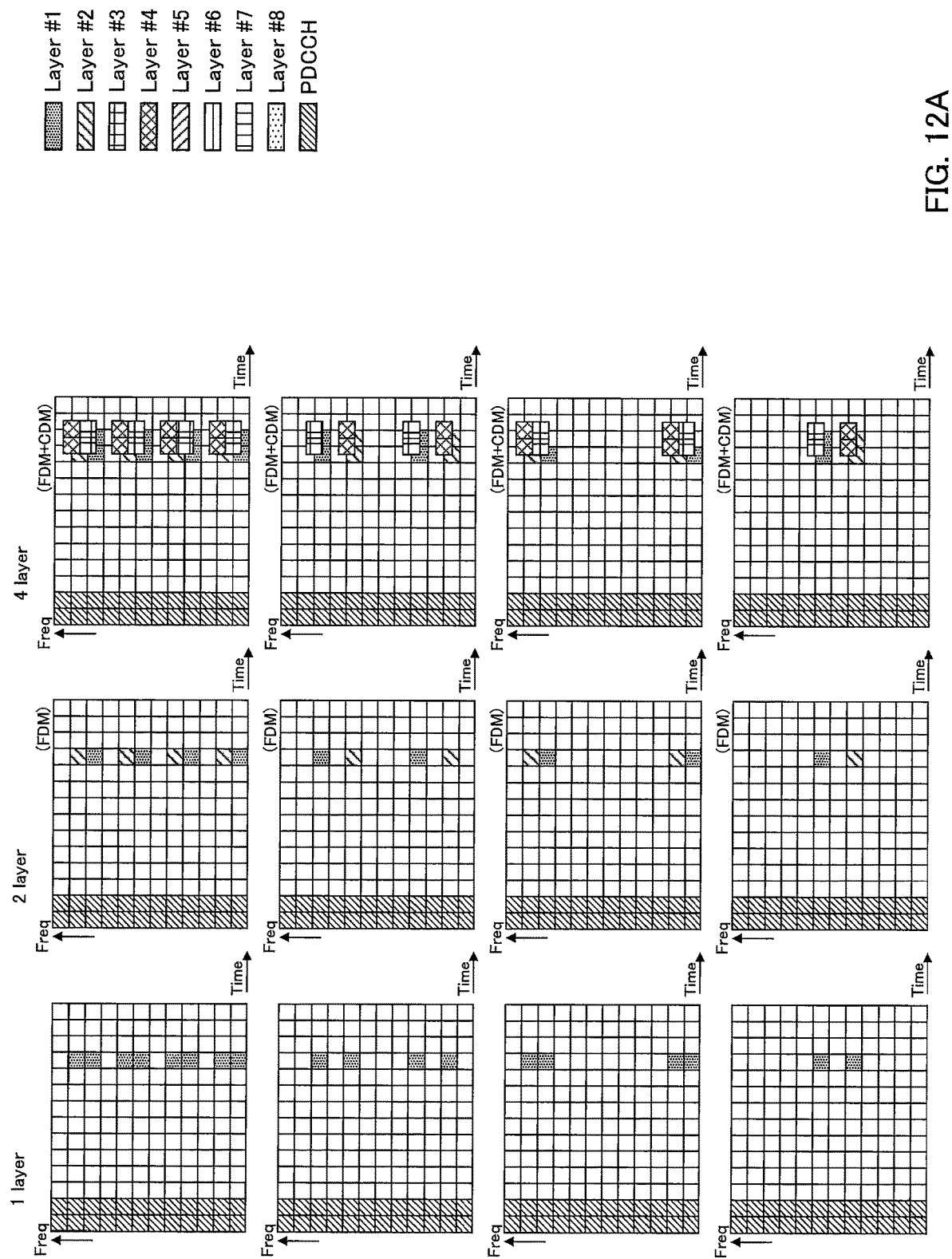
FIG. 12A illustrates an example of the mapping pattern of the additional DMRS added to the mapping pattern illustrated in FIG. 11.
Figure 12B:
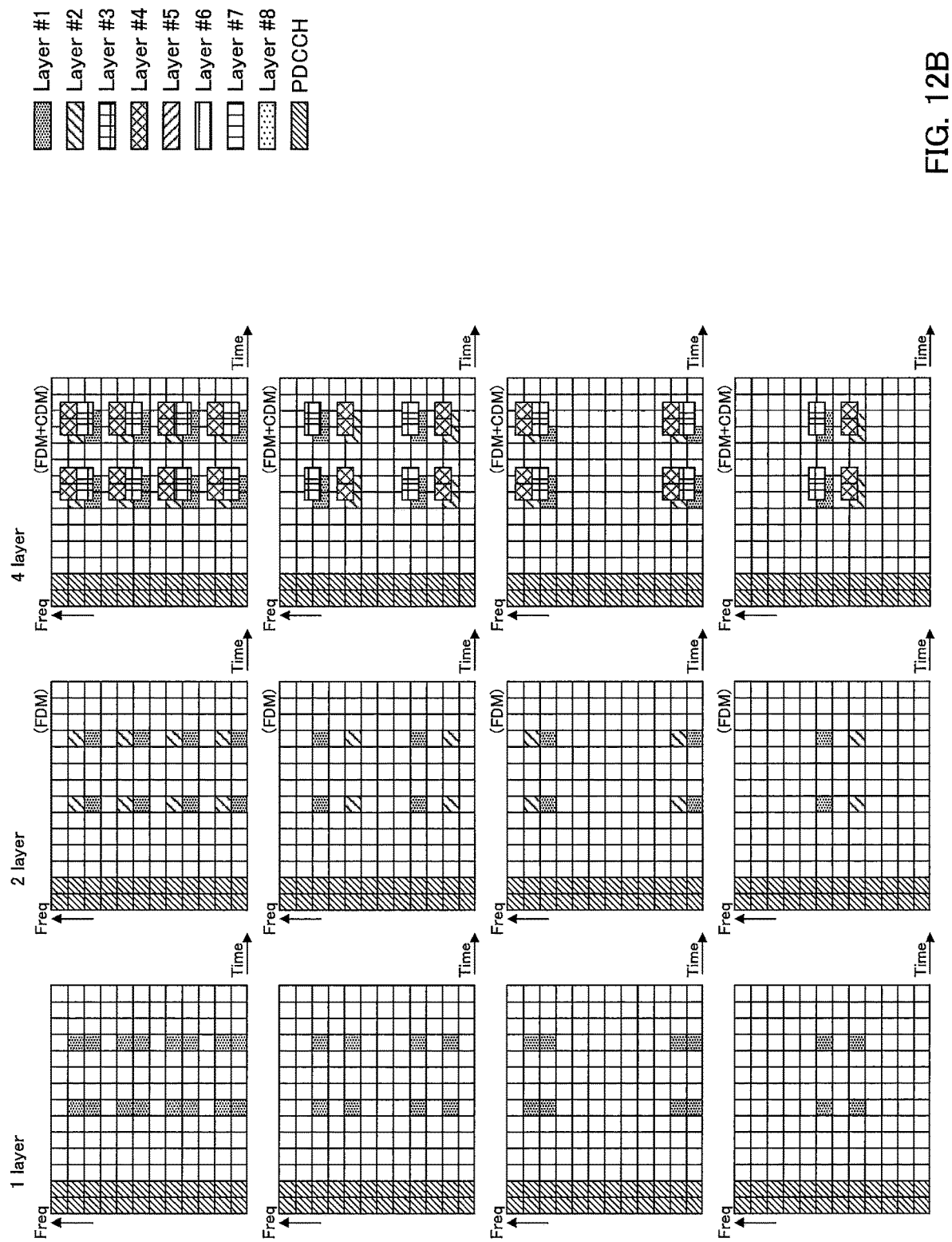
FIG. 12B illustrates an example of the mapping pattern of the additional DMRS added to the mapping pattern illustrated in FIG. 11.

FIGS. 12A and 12B illustrate examples of the mapping pattern of the additional DMRS added to the mapping pattern illustrated in FIG. 11. In the examples illustrated in FIGS. 12A and 12B, the control signal channel (for example, PDCCH) is mapped to RE for the beginning two symbols.

In FIGS. 12A and 12B, the mapping patterns of the additional DMRSs respectively for the mapping pattern with the number of layers being one illustrated in FIG. 11, the mapping pattern with the number of layers being two illustrated in FIG. 11, and the mapping pattern with the number of layers being four illustrated in FIG. 11 are arranged vertically for each number of layers.

The mapping patterns having the same number of layers illustrated in FIGS. 12A and 12B are different from the other mapping patterns, in at least one among the number of additional DMRSs, the subcarrier to be mapped, and the symbol to be mapped.

For example, according to the mapping patterns illustrated in FIG. 12A, the additional DMRS is mapped to RE for one symbol. According to the mapping patterns illustrated in FIG. 12B, the additional DMRSs are mapped at intervals with three symbols in the temporal direction.

According to the mapping pattern with the number of layers being four, the demodulation RS is multiplexed by applying CDM. Consequently, the additional DMRS is mapped to RE for two symbols that are consecutive in the temporal direction.

The property of tracking the temporal variation in channel can be improved by adding any of the additional DMRSs of the mapping patterns illustrated in FIGS. 12A and 12B to the mapping pattern illustrated in FIG. 11.

For example, when the radio base station and/or the user terminal using the mapping pattern of the demodulation RS illustrated in FIG. 11 detects the temporal variation in channel, any of the mapping patterns of the additional DMRSs illustrated in FIGS. 12A and 12B may be selected on the basis of the speed of the temporal variation and/or the position of the subcarrier where the temporal variation in channel occurs. Alternatively, the mapping pattern to be used among the mapping patterns of the additional DMRSs illustrated in FIGS. 12A and 12B may be predefined.

The mapping pattern of the additional DMRS for the mapping pattern of the demodulation RS illustrated in FIG. 11 is not limited to that in FIGS. 12A and 12B.

The additional DMRS and the demodulation RS may be symbols identical to or different from each other.

The additional DMRS is not necessarily discriminated from the additional demodulation RS or the demodulation RS.

A method of shifting the demodulation RS as described with reference to FIG. 6 may be applied.

FIGS. 8 and 9 illustrate the mapping patterns where the number of REs to which the demodulation RS is mapped in one RU is 24. However, the present invention is not limited to them. A variation of the mapping pattern where the number of REs to which the demodulation RS is mapped in one RU is 24, is described.

Figure 13A:
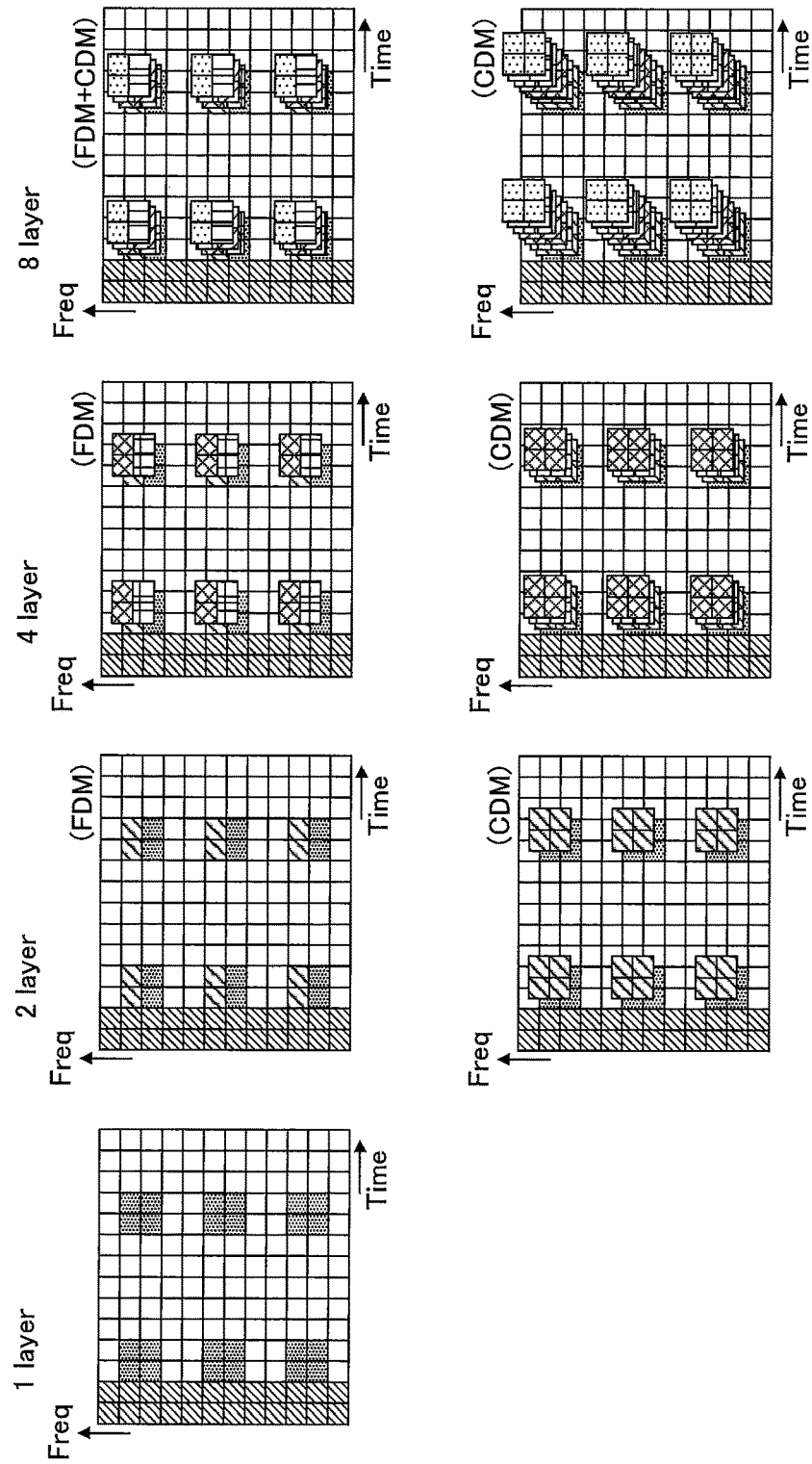
FIG. 13A illustrates a fourth example of mapping of the demodulation RS according to Modification Example 2 of the one embodiment of the present invention.
Figure 13B:
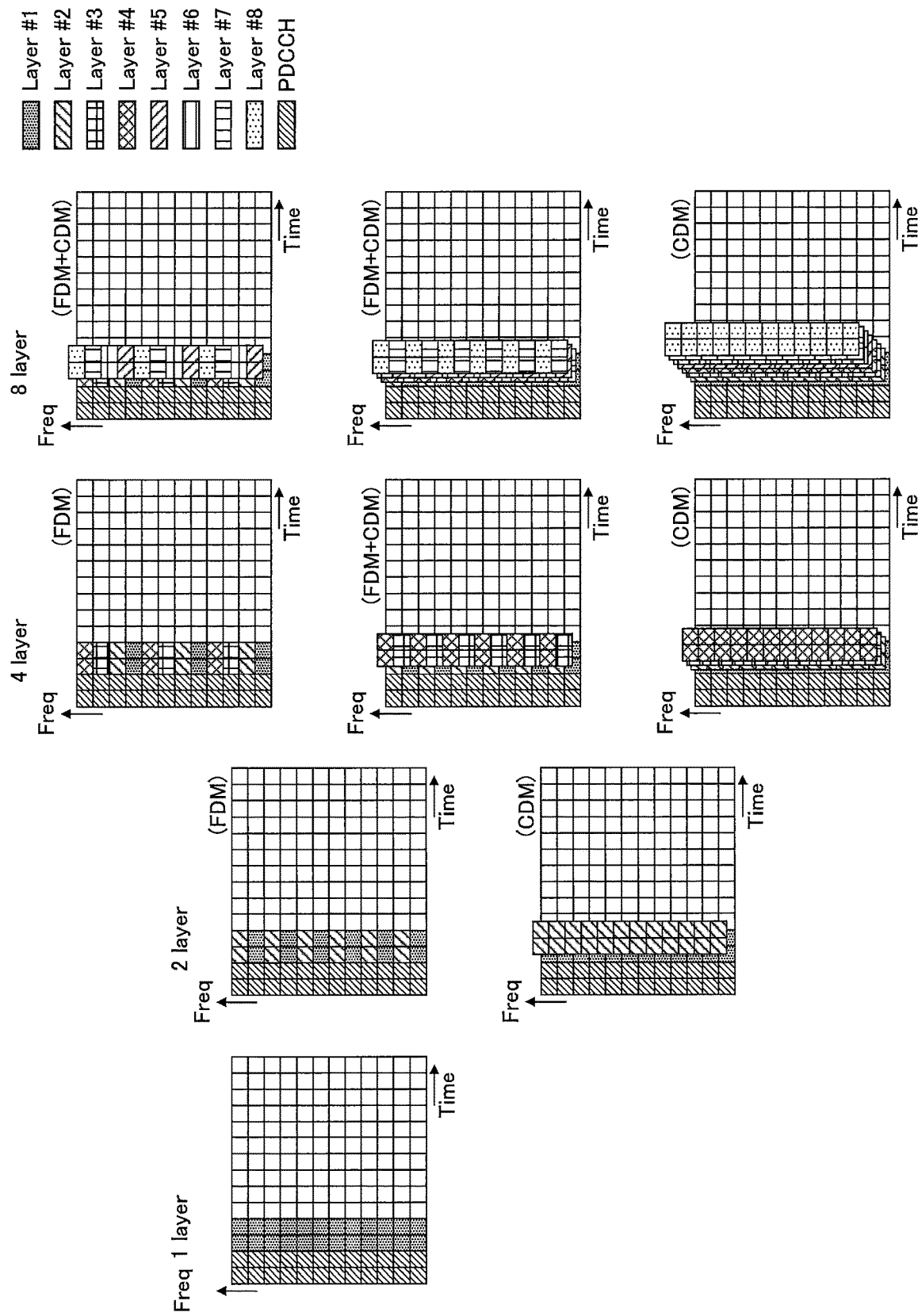
FIG. 13B illustrates the fourth example of mapping of the demodulation RS according to Modification Example 2 of the one embodiment of the present invention.

FIGS. 13A and 13B illustrate a fourth example of the mapping of the demodulation RS according to Modification Example 2 of this embodiment. In the examples illustrated in FIGS. 13A and 13B, the control signal channel (for example, PDCCH) is mapped to RE for the beginning two symbols.

FIGS. 13A and 13B illustrate a mapping pattern with the number of layers being one (1 layer), a mapping pattern with the number of layers being two (2 layers), a mapping pattern with the number of layers being four (4 layers), and a mapping pattern with the number of layers being eight (8 layers), which are arranged vertically for each number of layers. FIGS. 13A and 13B include mapping patterns analogous to the mapping patterns illustrated in FIGS. 8 and 9 in order to illustrate the similarity of the mapping patterns.

According to each mapping pattern illustrated in FIG. 13A, the demodulation RS is mapped to the identical RE. Specifically, as with FIG. 8, the demodulation RSs are mapped at intervals in each of the frequency direction and the temporal direction. According to the mapping patterns with the number of layers being two or more, the demodulation RS is multiplexed by applying CDM and/or FDM.

According to each mapping pattern illustrated in FIG. 13B, the demodulation RS is mapped to the identical RE. Specifically, as with FIG. 9, the demodulation RS is mapped densely in the frequency direction. According to the mapping patterns with the number of layers being two or more, the demodulation RS is multiplexed by applying CDM and/or FDM.

FIG. 11 illustrates the mapping pattern where the number of REs to which the demodulation RS is mapped is 16. However, the present invention is not limited to this. Next, a variation of the mapping pattern where the number of REs to which the demodulation RS is mapped is 16, is described.

Figure 14:
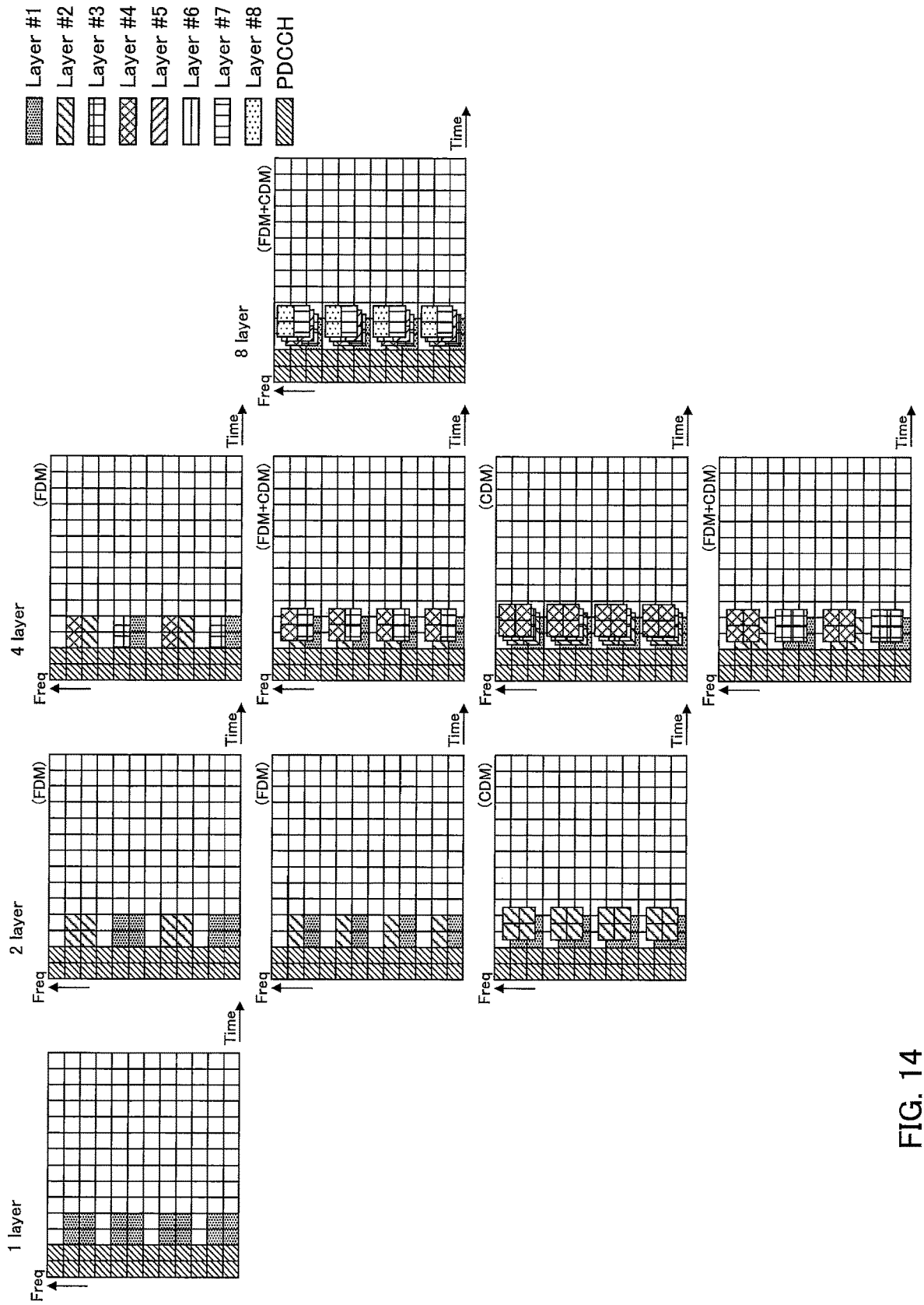
FIG. 14 illustrates a fifth example of mapping of the demodulation RS according to Modification Example 2 of the one embodiment of the present invention.

FIG. 14 illustrates a fifth example of the mapping of the demodulation RS according to Modification Example 2 of this embodiment. In the example illustrated in FIG. 14, the control signal channel (for example, PDCCH) is mapped to RE for the beginning two symbols.

FIG. 14 illustrates a mapping pattern with the number of layers being one (1 layer), a mapping pattern with the number of layers being two (2 layers), a mapping pattern with the number of layers being four (4 layers), and a mapping pattern with the number of layers being eight (8 layers), which are arranged vertically for each number of layers. FIG. 14 includes mapping patterns analogous to the mapping patterns illustrated in FIG. 11 in order to illustrate the similarity of the mapping patterns.

According to each mapping pattern illustrated in FIG. 14, the demodulation RS is mapped to the identical RE. Specifically, as with FIG. 11, the demodulation RS is mapped densely in the frequency direction. According to the mapping patterns with the number of layers being two or more, the demodulation RS is multiplexed by applying CDM and/or FDM.

In the above description, the mapping patterns where the number of REs to which the demodulation RS is mapped in one RU is 16 or 24 are described. However, the present invention is not limited to them. Hereinafter, a variation of the mapping pattern where the number of REs to which the demodulation RS is mapped in one RU is 12, is described as an example.

Figure 15A:
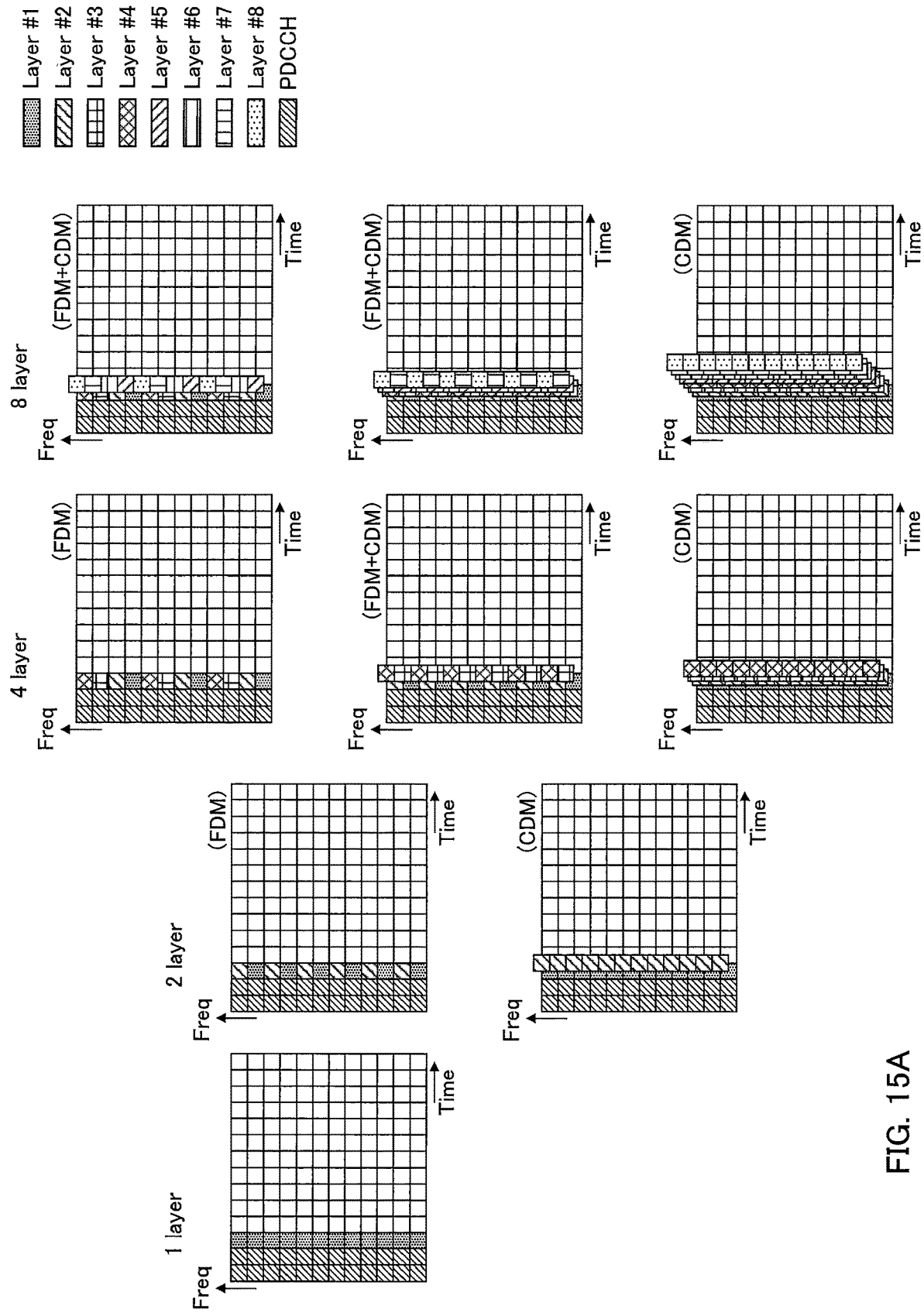
FIG. 15A illustrates a sixth example of mapping of the demodulation RS according to Modification Example 2 of the one embodiment of the present invention.
Figure 15B:
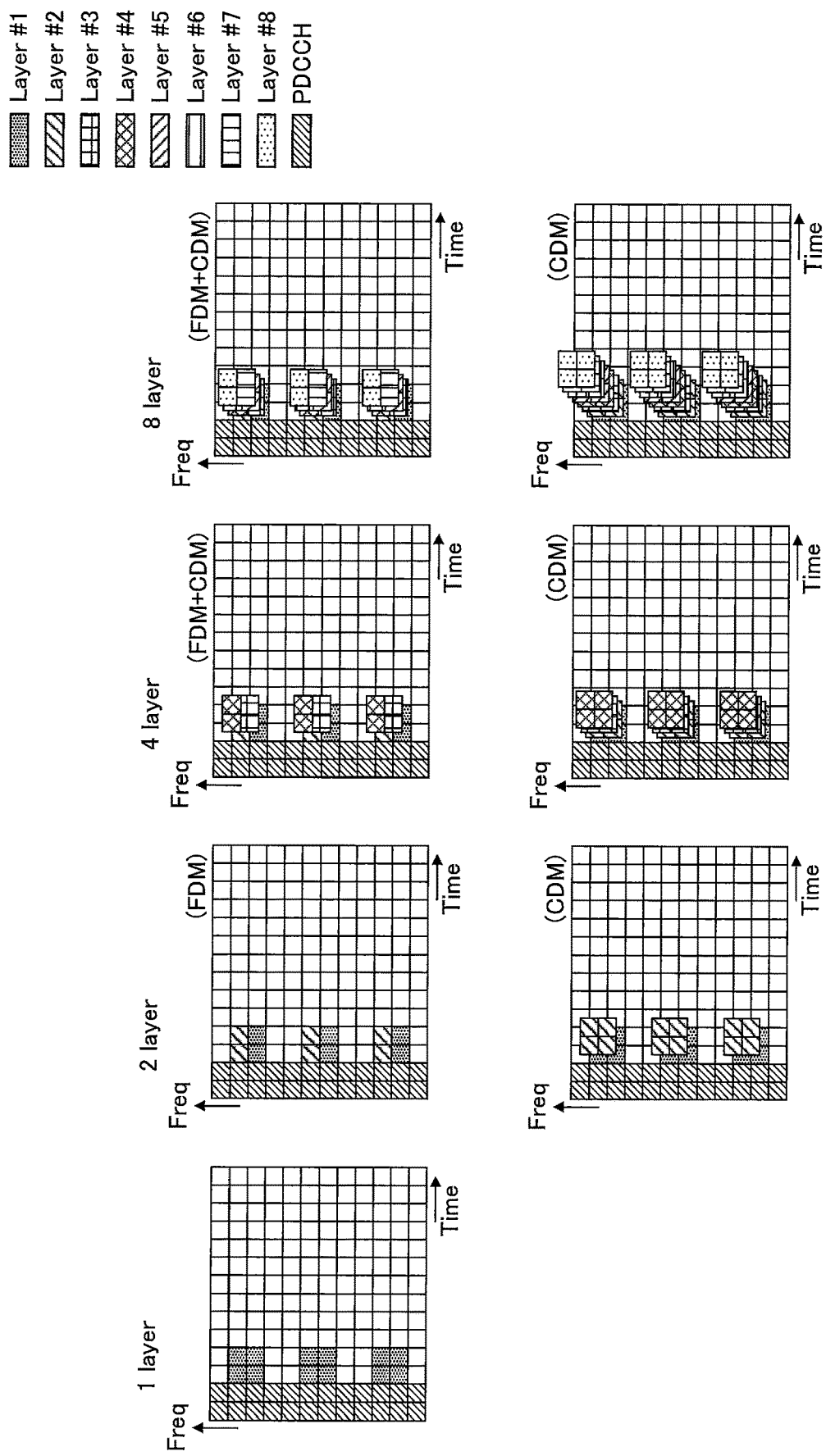
FIG. 15B illustrates the sixth example of mapping of the demodulation RS according to Modification Example 2 of the one embodiment of the present invention.
Figure 15C:
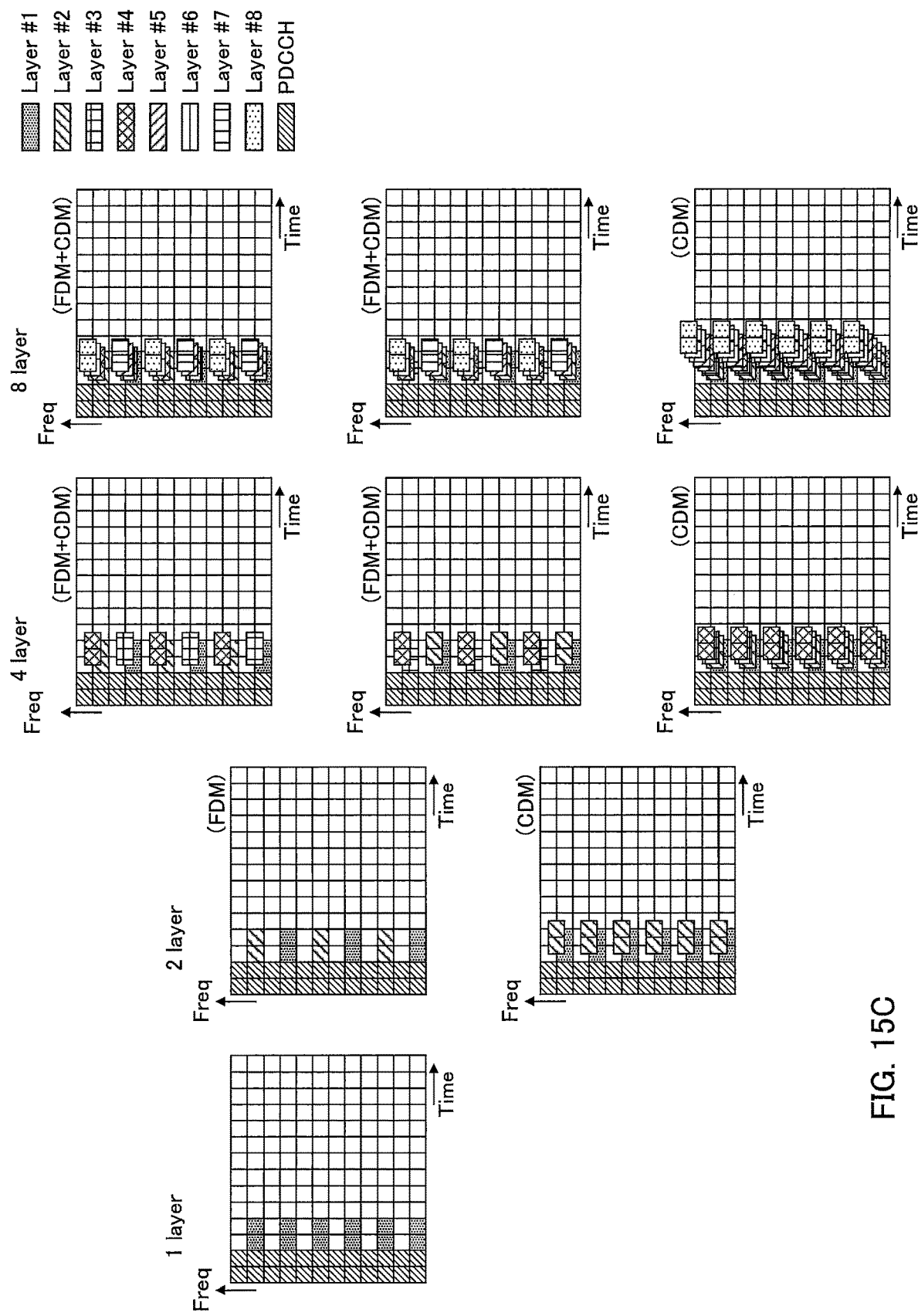
FIG. 15C illustrates the sixth example of mapping of the demodulation RS according to Modification Example 2 of the one embodiment of the present invention.

FIGS. 15A to 15C illustrate a sixth example of the mapping of the demodulation RS according to Modification Example 2 of this embodiment. In the examples illustrated in FIGS. 15A to 15C, the control signal channel (for example, PDCCH) is mapped to RE for the beginning two symbols.

FIGS. 15A to 15C illustrate a mapping pattern with the number of layers being one (1 layer), a mapping pattern with the number of layers being two (2 layers), a mapping pattern with the number of layers being four (4 layers), and a mapping pattern with the number of layers being eight (8 layers), which are arranged vertically for each number of layers.

According to each mapping pattern illustrated in FIG. 15A, the demodulation RS is mapped to the identical RE. Specifically, the demodulation RS is mapped densely, sequentially in the frequency direction. According to the mapping patterns with the number of layers being two or more, the demodulation RS is multiplexed by applying CDM and/or FDM.

According to each mapping pattern illustrated in FIG. 15B, the demodulation RS is mapped to the identical RE. Specifically, four demodulation RSs are mapped sequentially two subcarriers in the frequency direction and two symbols in the temporal direction. The four demodulation RSs are mapped at intervals of two subcarriers in the frequency direction. According to the mapping patterns with the number of layers being two or more, the demodulation RS is multiplexed by applying CDM and/or FDM.

According to each mapping pattern illustrated in FIG. 15C, the demodulation RS is mapped to the identical RE. Specifically, two demodulation RSs are mapped sequentially by two symbols in the temporal direction. The two demodulation RSs are mapped at intervals of one subcarrier in the frequency direction. According to the mapping patterns with the number of layers being two or more, the demodulation RS is multiplexed by applying CDM and/or FDM.

With reference to FIG. 8, the mapping patterns where the multiple demodulation RSs are mapped at intervals both in the frequency direction and the temporal direction have been described. Hereinafter, an example of a variation according to the intervals of multiple demodulation RSs in the frequency direction and the temporal direction and/or the number of demodulation RSs, is described.

Figure 16A:
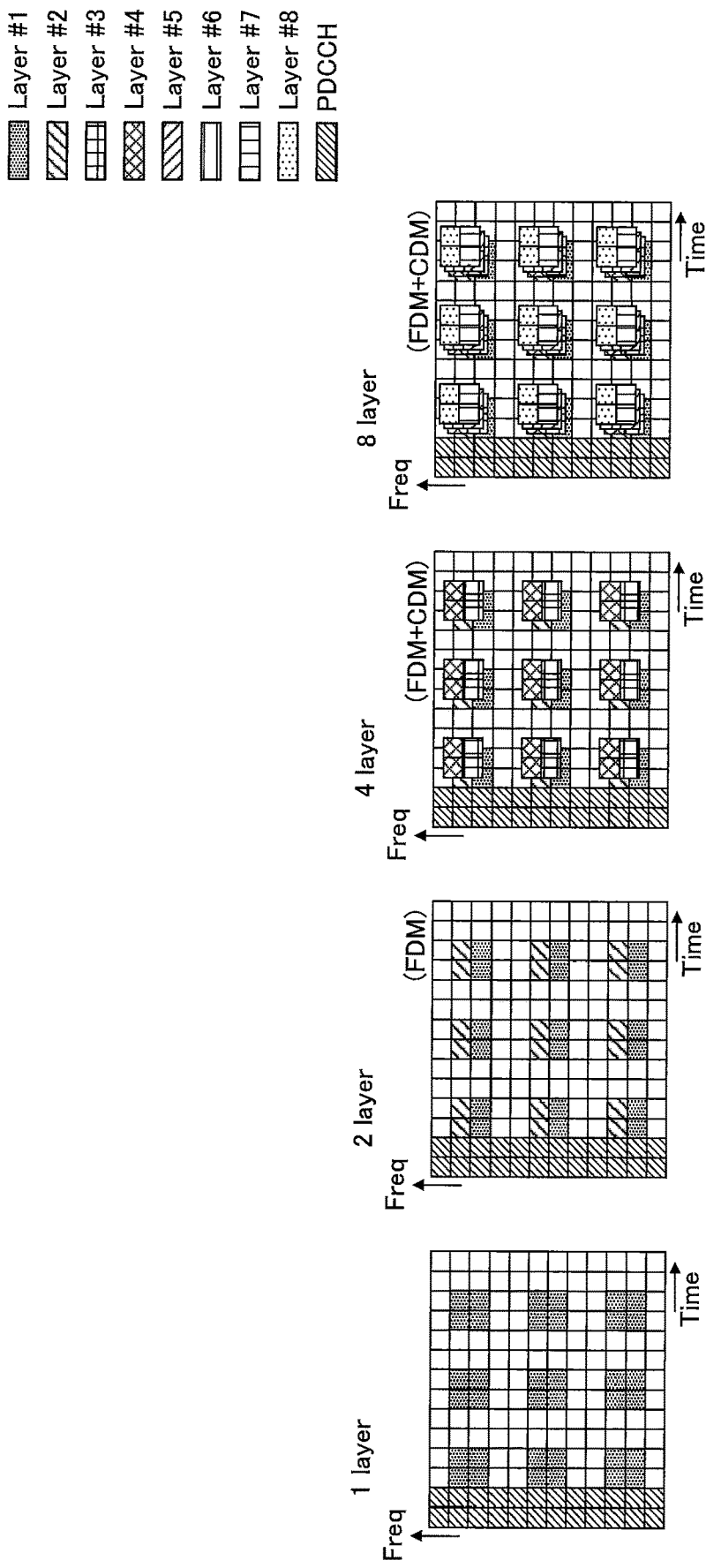
FIG. 16A illustrates a seventh example of mapping of the demodulation RS according to Modification Example 2 of the one embodiment of the present invention.
Figure 16B:
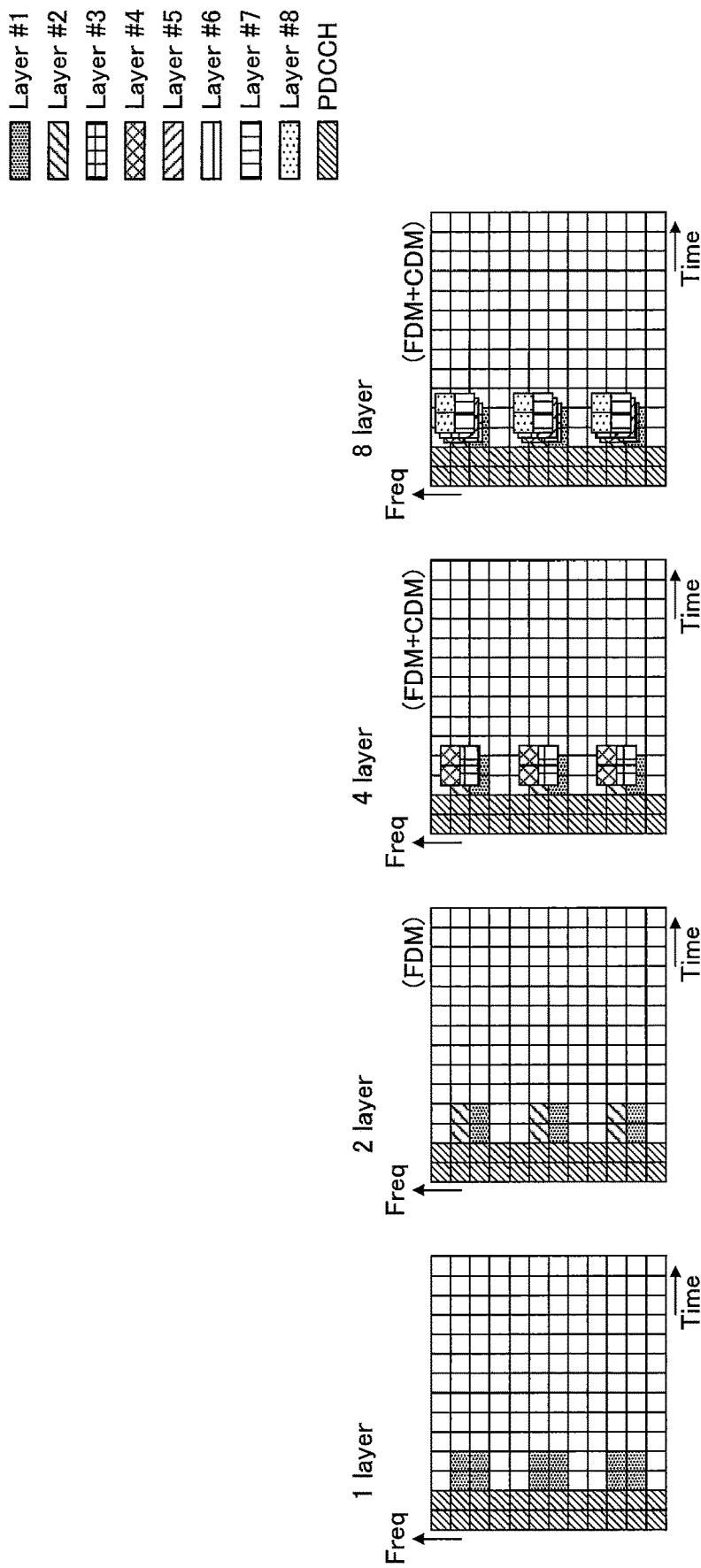
FIG. 16B illustrates the seventh example of mapping of the demodulation RS according to Modification Example 2 of the one embodiment of the present invention.

FIGS. 16A and 16B illustrate a seventh example of the mapping of the demodulation RS according to Modification Example 2 of this embodiment. In the examples illustrated in FIGS. 16A and 16B, the control signal channel (for example, PDCCH) is mapped to RE for the beginning two symbols.

FIGS. 16A and 16B illustrate a mapping pattern with the number of layers being one (1 layer), a mapping pattern with the number of layers being two (2 layers), a mapping pattern with the number of layers being four (4 layers), and a mapping pattern with the number of layers being eight (8 layers). In the mapping pattern with the number of layers being two, the demodulation RS is multiplexed by applying FDM. In the mapping pattern with the number of layers being four and the mapping pattern with the number of layers being eight, the demodulation RS is multiplexed by applying FDM and CDM.

In each mapping pattern illustrated in FIG. 16A, more demodulation RSs are mapped in the temporal direction than that in each mapping pattern illustrated in FIG. 8. In other words, the demodulation RSs are denser in the temporal direction. Accordingly, each mapping pattern illustrated in FIG. 16A is a mapping pattern more resistant to the temporal variation in channel than each mapping pattern illustrated in FIG. 8. In comparison with the data channel, the number of multiplexed layers in the identical RE decreases. Consequently, the power boost can be achieved.

In each mapping pattern illustrated in FIG. 16B, less demodulation RSs are mapped in the temporal direction than that in each mapping pattern illustrated in FIG. 8. In other words, the demodulation RSs are sparser in the temporal direction. Accordingly, each mapping pattern illustrated in FIG. 16B is a mapping pattern that is less resistant to the temporal variation in channel than each mapping pattern illustrated in FIG. 8 but has reduced overhead. For example, each mapping pattern illustrated in FIG. 16B is used in a high frequency band where low layer transmission is to be performed. In comparison with the data channel, the number of multiplexed layers in the identical RE decreases. Consequently, the power boost can be achieved.

In Modification Example 2 of this embodiment, the examples of the variation of the mapping pattern with respect to the difference in the number of layers, and the variation of the mapping pattern with respect to the difference in the number of REs to which the demodulation RS is mapped in one RU have been described above. As for the mapping pattern setting, mapping patterns different with respect to each layer configuration (for example, the number of layers) may be set.

For example, the mapping pattern where the number of layers is one may be set from among the mapping patterns where the number of REs to which the demodulation RS is mapped in one RU is 12 (for example, the examples illustrated in FIGS. 15A to 15C). The mapping pattern where the number of layers is two may be set from among the mapping patterns where the number of REs to which the demodulation RS is mapped in one RU is 24 (for example, the examples illustrated in FIGS. 13A and 13C).

In the aforementioned Modification Example 2 of this embodiment, the example where the control signal channel (for example, PDCCH) is mapped to RE for the beginning two symbols has been described. However, the number of REs to which the control signal channel is mapped is not limited to this. Furthermore, channels other than the control channel may be mapped. The control signal channel is not necessarily mapped to the symbols. For example, in a case where the control signal channel is not mapped in the mapping pattern illustrated in FIG. 8, the demodulation RS may be shifted forward by two symbols as illustrated in FIG. 6. At this time, only the demodulation RS mapped to the third symbol or the fourth symbol may be shifted forward. Alternatively, the entire demodulation RS may be shifted forward.

Modification Example 3 of One Embodiment

In Modification Example 3 of this embodiment, an example is described where the radio base station switches a case of application of the same antenna port to multiple user terminals and a case of application of different antenna ports to multiple user terminals.

The radio base station that communicates with the multiple user terminals using the MU-MIMO scheme sets an antenna port (port number) to each user terminal. The radio base station uses the antenna port set to each user terminal, to transmit the DL signal (the DL data signal, the DL control signal, the demodulation RS and/or the like) destined for the user terminal. The user terminal performs a process of receiving the DL signal corresponding to the antenna port applied by the radio base station.

An example of a case of application of port number 7 and port number 8 to two user terminals is adopted, and the case of application of the same antenna port to the multiple user terminals, and the case of application of different antenna ports to the multiple user terminals are described.

The case of application of the same antenna port to the multiple user terminals is a case of applying both port number 7 and port number 8 to each of the two user terminals. The case of application of the different antenna ports to the multiple user terminals is a case of applying port number 7 to the first user terminal of the two user terminals while applying port number 8 to the second user terminal.

Referring to FIGS. 2 and 3, the processing of radio base station 10 and user terminal 20 in Modification Example 3 of this embodiment is described.

Radio base station 10 determines whether to apply the same antenna port to multiple user terminals 20 or to apply different antenna ports to multiple user terminals 20. For example, this determination is executed by controller 101 on the basis of the number of antenna ports, and/or the number of user terminals, and/or the precoding index set for the user terminal, and/or information relating thereto, and/or information relating to correlation (orthogonality) of the propagation channel between the user terminals. Radio base station 10 performs a process of switching a method (multiplexing method) of transmitting the DL signal (the DL data signal, the DL control signal, the demodulation RS and/or the like) destined for the multiple user terminals, according to whether to apply the same antenna port to multiple user terminals 20 or to apply different antenna ports to multiple user terminals 20. For example, this process is executed by controller 101 switching the scheduling information to be output to transmission signal generator 102 and mapper 104, and the precoding information to be output to transmission signal generator 102 and precoding processor 103.

Specifically, in the case of application of the same antenna port to multiple user terminals 20, radio base station 10 multiplexes the DL signals destined for the multiple user terminals by applying CDM and/or FDM, which is applied for port multiplexing, to different ports in user terminal 20, and using precoding-applied SDM between multiple user terminals 20. Precoding is executed by precoding processor 103, for example.

In the case of application of the different antenna ports to multiple user terminals 20, radio base station 10 multiplexes the DL signals destined for the multiple user terminals by applying CDM and/or FDM applied for port multiplexing.

Radio base station 10 notifies each user terminal 20 of the antenna port set for the corresponding user terminal and of the method of multiplexing the DL signal destined for the corresponding user terminal. As for the notification to user terminal 20, for example, user terminal 20 may be notified using higher layer (for example, RRC or MAC) signaling, or notified using physical layer (PHY) signaling.

User terminal 20 having received the notification performs a process of receiving the DL signal (the DL data signal, the DL control signal, the demodulation RS and/or the like) on the basis of the antenna port designated by radio base station 10 through signaling and of the designated multiplexing method.

Next, the mapping pattern of the demodulation RS included in the DL signal is described using a case of two user terminals including user terminal #1 and user terminal #2, for example.

Figure 17:
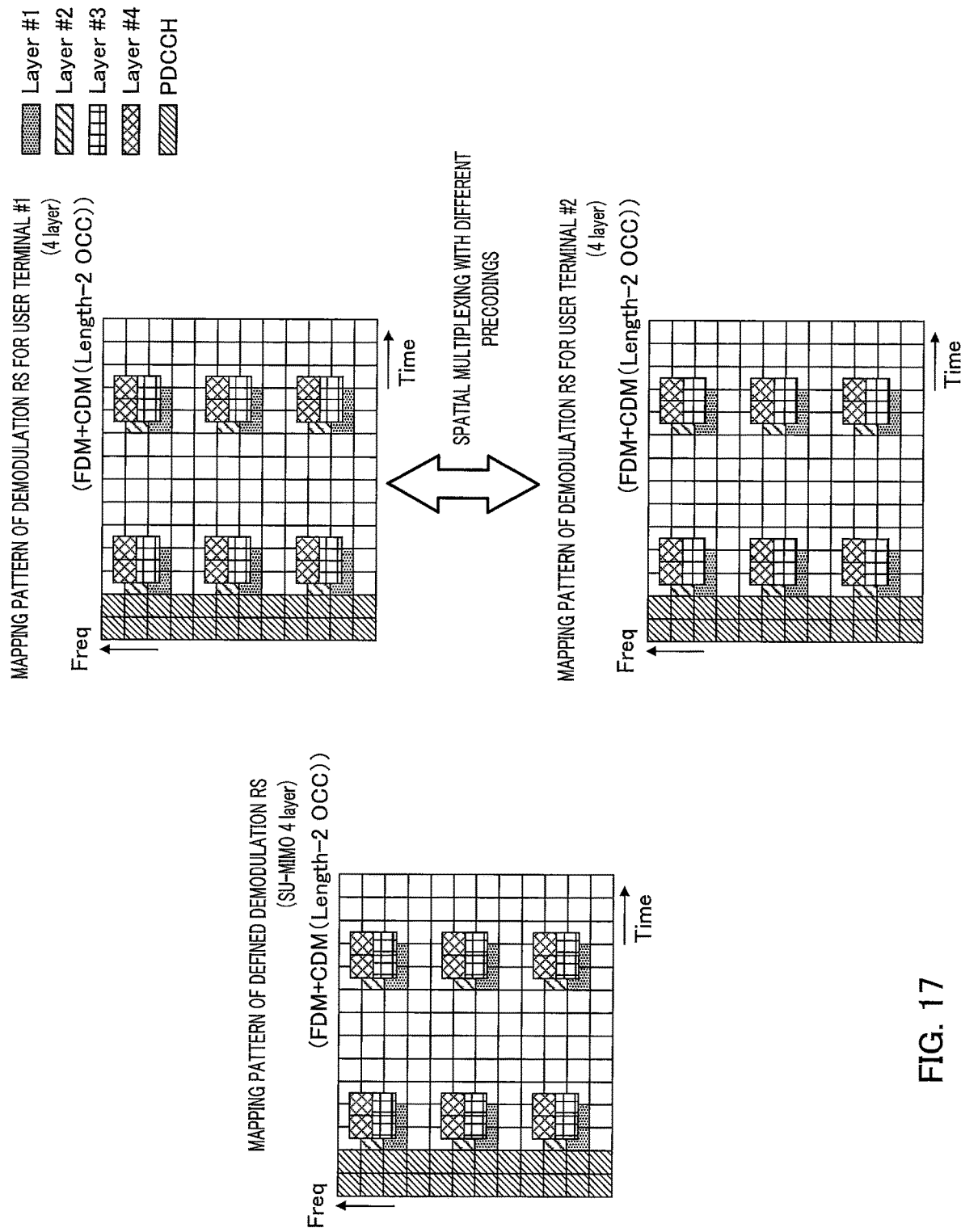
FIG. 17 illustrates a first example of mapping of a demodulation RS according to Modification Example 3 of the one embodiment of the present invention.

FIG. 17 illustrates a first example of the mapping of the demodulation RS according to Modification Example 3 of this embodiment. The example in FIG. 17 is an example of application of the same antenna port to the two user terminals.

FIG. 17 illustrates the defined mapping pattern of the demodulation RS, the mapping pattern of the demodulation RS for user terminal #1, and the mapping pattern of the demodulation RS for user terminal #2. In each mapping pattern illustrated in FIG. 17, the control signal channel (for example, PDCCH) is mapped to RE for the beginning two symbols.

The defined mapping pattern of the demodulation RS is a mapping pattern where the number of layers of the single-user multiple-input multiple-output (SU-MIMO) is four. According to the defined mapping pattern, the demodulation RS is multiplexed by applying FDM and CDM. The sequence used for CDM is the orthogonal cover code (OCC) sequence having the sequence length of two (Length-2 OCC).

The same antenna port is applied to user terminal #1 and user terminal #2. Accordingly, the demodulation RS for user terminal #1 and the demodulation RS for user terminal #2 are spatially multiplexed using different precodings.

As illustrated in FIG. 17, the demodulation RSs for the multiple user terminals are spatially multiplexed and are transmitted through the same antenna port. Accordingly, the number of antenna ports can be reduced. Consequently, it is possible to reduce the overhead.

Figure 18:
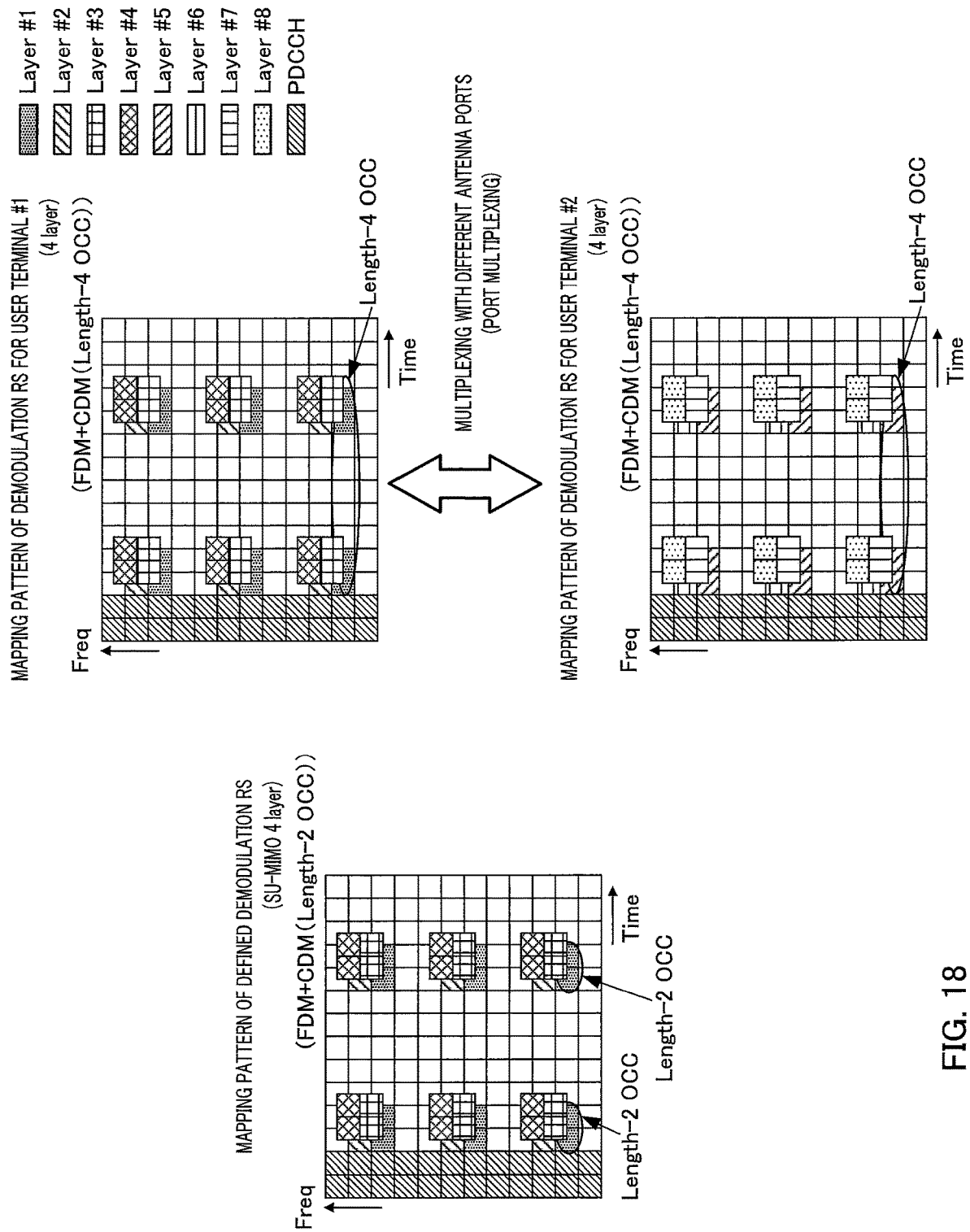
FIG. 18 illustrates a second example of mapping of the demodulation RS according to Modification Example 3 of the one embodiment of the present invention.

FIG. 18 illustrates a second example of the mapping of the demodulation RS according to Modification Example 3 of this embodiment. The example in FIG. 18 is an example of application of the different antenna ports to the two user terminals.

FIG. 18 illustrates the defined mapping pattern of the demodulation RS, the mapping pattern of the demodulation RS for user terminal #1, and the mapping pattern of the demodulation RS for user terminal #2. In each mapping pattern illustrated in FIG. 18, the control signal channel (for example, PDCCH) is mapped to RE for the beginning two symbols.

The defined mapping pattern of the demodulation RS is a mapping pattern where the number of layers of SU-MIMO is four. According to the defined mapping pattern, the demodulation RS is multiplexed using FDM and CDM. The sequence used for CDM is an OCC sequence having the sequence length of two (Length-2 OCC).

The different antenna ports are applied to user terminal #1 and user terminal #2. In other words, the mapping pattern of the demodulation RS for user terminal #1, and the mapping pattern of the demodulation RS for user terminal #2 illustrated in FIG. 18 are mapping patterns of the demodulation RS to which different antenna ports are applied.

CDM used for the mapping pattern of the demodulation RS for user terminal #1 and the mapping pattern of the demodulation RS for user terminal #2 adopts an OCC sequence having the sequence length of four (Length-4 OCC).

As illustrated in FIG. 18, in a case of application of the different antenna ports to the multiple user terminals, the sequence used for CDM is configured to have a length longer than the defined length. This configuration can realize MU-MIMO multiplexing without increasing the overhead.

In the aforementioned Modification Example 3 of this embodiment, the example has been described where radio base station 10 notifies individual user terminals 20 of the antenna ports applied to multiple user terminals 20 and of the method of multiplexing the DL signals destined for multiple user terminals, through signaling. However, the present invention is not limited to this. For example, in a case where the applied antenna ports and multiplexing method are predefined, notification using signaling is not required.

The defined mapping pattern described in the aforementioned Modification Example 3 of this embodiment is an example. The present invention is not limited to this. The defined mapping pattern in Modification Example 3 of this embodiment may be any of the mapping patterns exemplified in the other embodiments and their modification examples.

In the aforementioned Modification Example 3 of this embodiment, the case where the number of user terminals is two has been described. However, the present invention is not limited to this. The number of user terminals may be three or more. In this case, application of the same antenna port to the user terminals and application of different antenna ports may be adopted in a mixed manner. Alternatively, the application may be limited to any of the methods. The case in the mixed manner is, for example, a case where among three user terminals including user terminal #1 to user terminal #3, the same antenna port is applied to user terminal #1 and user terminal #2, and an antenna port different from the antenna port applied to user terminals #1 and #2 is applied to user terminal #3.

The number of mapping patterns, the number of groups, and the number of layers, which have been described in the aforementioned embodiments, are examples. The present invention is not limited to this.

In the aforementioned embodiments, the examples where the same number of demodulation RSs are mapped according to each mapping pattern have been described. However, the present invention is not limited to this. The number of demodulation RSs to be mapped may be different among mapping patterns. In other words, the mapping patterns may have overhead sizes different from each other according to the number of layers to be multiplexed.

In the aforementioned embodiments, the examples have been described where in each mapping pattern, the mapping intervals of the demodulation RSs in the frequency direction are an equal interval. However, the present invention is not limited to this. The mapping intervals of the demodulation RSs in the frequency direction are not necessarily an equal interval. The examples have been described where in each mapping pattern, the mapping intervals of the demodulation RSs in the temporal direction are an equal interval. However, the present invention is not limited to this. The mapping intervals of the demodulation RSs in the temporal direction are not necessarily an equal interval.

In the aforementioned embodiments, in each mapping pattern, the mapping intervals of the demodulation RSs in the frequency direction are different from the mapping intervals of the demodulation RSs in the frequency direction. However, the present invention is not limited to this. The mapping patterns may include mapping patterns where any one of the mapping intervals of the demodulation RSs in the frequency direction and the mapping intervals of the demodulation RSs in the frequency direction is the same but the other is different.

The reference signals mapped on the basis of the mapping pattern are not necessarily entirely the same reference signal. For example, a reference signal other than the demodulation RS may be mapped on the basis of the mapping pattern.

The mapping pattern may be set according to the data channel. For example, the demodulation RS for a subframe including a specific data channel may be mapped on the basis of a predefined basic mapping pattern. The specific data channel may be, for example, a data channel including System Information, a data channel including Signaling Radio Bearer (SRB), a data channel including Hand over command, a data channel scheduled by Downlink Control Information (DCI) transmitted through Common search space, a data channel including Activation command and/or the like.

The basic mapping pattern is a pattern of mapping the demodulation RSs densely in the frequency direction and/or the temporal direction in order to secure a sufficient channel estimation accuracy. On the specific data channel, use of the basic mapping pattern can secure the demodulation quality.

Various methods are applicable to the mapping pattern changing method. For example, the user terminal may implicitly determine and change the mapping pattern on the basis of at least one of the requirement of the terminal, such as the system bandwidth, the carrier frequency, the subcarrier interval, the latency time, or the highly reliable communication, data to be transmitted, the mapping pattern and/or the like. Alternatively, the user terminal may receive a notification using higher layer (RRC, MAC and/or the like) signaling or physical layer signaling, and change the mapping pattern. In this case, the notification may be performed periodically or dynamically.

In this embodiment, demodulation RS sequence generation procedures are not specifically limited. For example, a pseudo noise (PN) sequence that has any of physical cell identities (PCID), virtual cell identities (VCID), and user equipment identities (UE-ID) or a combination thereof as a sequence seed may be generated, and the demodulation RS may be generated using the PN sequence. Alternatively, the demodulation RS may be generated using another sequence, such as Zadoff-Chu sequence, instead of the PN sequence.

The mapping patterns of the demodulation RSs for the control channel (for example, PDCCH) and the data channel (for example, PDSCH) may be independently set or collectively set. In the case of collective setting of the mapping patterns of the demodulation RSs for the control channel and the data channel, notifications about the indices of the mapping patterns respectively given thereto may be issued, or multiple mapping patterns may be aggregated and one index may be set and a notification about the one index may be issued.

The demodulation RS described above may be called DMRS. The demodulation RS may be called a reference signal, RS and/or the like.

In the above description, the downlink communication from radio base station 10 to user terminal 20 has been described. The embodiments described above are applicable also to the uplink communication from user terminal 20 to radio base station 10. In this case, the configuration of radio base station 10 illustrated in FIG. 2 (the configuration of transmission side of the demodulation RS of the DL signal) may be replaced with the configuration of the user terminal for uplink, and the configuration of user terminal 20 illustrated in FIG. 3 (the configuration of reception side of the demodulation RS of the DL signal) may be replaced with the configuration of the radio base station for uplink.

In the uplink case, specifically, the radio base station selects a mapping pattern (transmission pattern) indicating a resource to which the demodulation RS of the UL signal is to be mapped, from among predefined mapping pattern candidates (candidate patterns). The user terminal is notified of the index indicating the selected mapping pattern. The user terminal maps the demodulation RS of the UL signal to the radio resource on the basis of the mapping pattern indicated by the index notified from the radio base station, and transmits the mapped signal to the radio base station.

The radio base station separates (demaps) the demodulation RS from the UL signal on the basis of the selected mapping pattern (transmission pattern), and performs channel estimation using the separated demodulation RS.

In a case of application also to the uplink communication, the configuration (for example, mapping) of the UL reference signal (for example, a demodulation RS) and/or the like can be realized that is suitable to a future radio communication system that is assumed to support a wide frequency band ranging from a low frequency band to a high frequency band and to adopt different numerologies, also in the uplink, in a manner analogous to that of the downlink.

In the above description, in the uplink case, the example has been described where the radio base station selects the mapping pattern (transmission pattern) indicating the resource to which the demodulation RS of the UL signal is to be mapped, from among the predefined mapping pattern candidates (candidate patterns). Alternatively, the user terminal may select the mapping pattern of the demodulation RS of the UL signal. In this case, the user terminal notifies the radio base station of the index indicating the selected mapping pattern. The user terminal then maps the demodulation RS of the UL signal to the radio resource on the basis of the selected mapping pattern, and transmits the mapped signal to the radio base station. The radio base station separates (demaps) the demodulation RS from the UL signal on the basis of the mapping pattern of the demodulation RS of the UL signal, this pattern being indicated by the index having been notified from the terminal, and estimates the channel using the separated demodulation RS.

Each embodiment of the present invention has been described above.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 19:
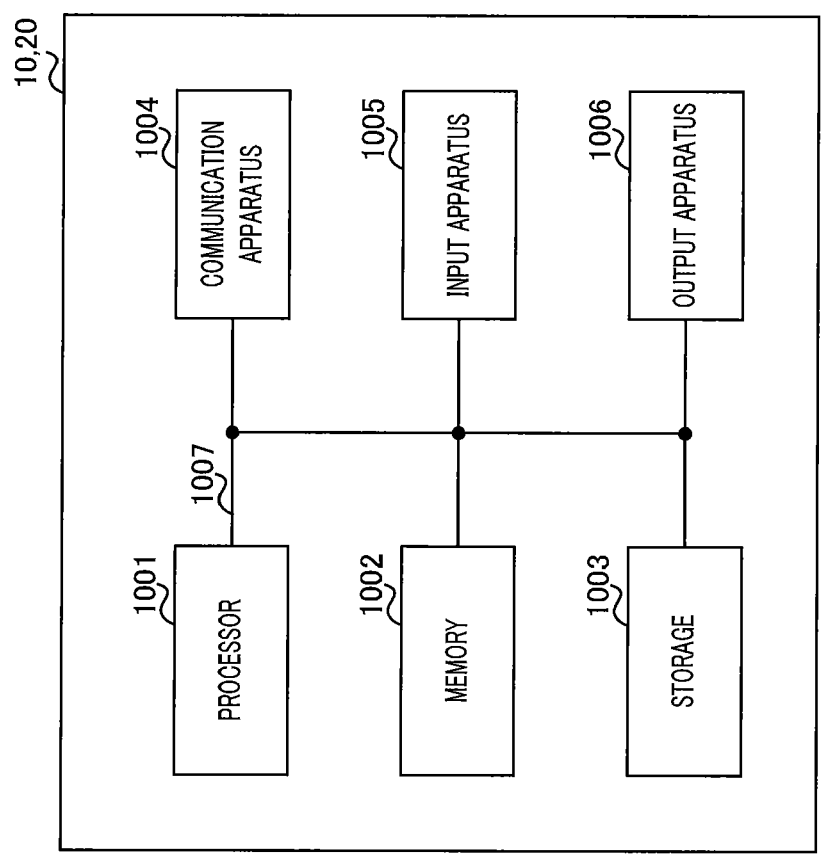
FIG. 19 illustrates an example of hardware configurations of a radio base station and a user terminal according to the one embodiment of the present invention.

For example, the radio base station, the user terminal, and/or the like, according to an embodiment of the present invention may function as computers which perform processing of the radio communication method of the present invention. FIG. 19 illustrates an example of hardware configurations of the radio base station and the user terminal according to an embodiment of the present invention. The above-described radio base station 10 and user terminal 20 may be physically configured as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, controller 101, transmission signal generator 102, precoding processor 103, mapper 104, IFFT processor 105, FFT processor 203, signal separator 204, controller 205, channel estimator 206, demodulator and decoder 207 and/or the like, which have been described above, may be achieved by processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, controller 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitter 106, antenna 107, antenna 201, receiver 202 and/or the like, which have been described above, may be achieved by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and/or the Like)

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and/or the like can be output from a higher layer (or a lower layer) to a lower layer (or a higher layer). The information, the signals, and/or the like may be input and output through a plurality of network nodes.

(Handling of Input and Output Information and/or the Like)

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

("System" and "Network")

The terms "system" and "network" used in the present specification can be interchangeably used.

(Names of Parameters and Channels)

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, and/or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, and/or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and/or the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2016-157938 filed on Aug. 10, 2016, Japanese Patent Application No. 2016-237974 filed on Dec. 7, 2016, and Japanese Patent Application No. 2017-001312 filed on Jan. 6, 2017, and the entire contents of Japanese Patent Application No. 2016-157938, Japanese Patent Application No. 2016-237974, and Japanese Patent Application No. 2017-001312 are hereby incorporated by reference.

INDUSTRIAL APPLICABILITY

An aspect of the present invention is useful for a mobile communication system.

REFERENCE SIGNS LIST

10 Radio base station
20 User terminal
101, 205 Controller
102 Transmission signal generator
103 Precoding processor
104 Mapper
105 IFFT processor
106 Transmitter
107, 201 Antenna
202 Receiver
203 FFT processor
204 Signal separator
206 Channel estimator
207 Demodulator and decoder

The invention claimed is:

1. A terminal, comprising:
a receiver that receives, via radio resource control (RRC) signaling, information of a configuration indicative of a group of resources among a plurality of groups of resources to which a demodulation reference signal is mapped and receives downlink control information (DCI) including an index; and
a processor that controls reception of a demodulation reference signal in a physical downlink shared channel (PDSCH) using a resource among the group of resources based on the index and the group of resources,
wherein a maximum number of symbols to which the demodulation reference signal is mapped to a resource for the PDSCH is configured by the RRC signaling,
wherein an additional demodulation reference signal is further mapped in the PDSCH,
wherein a position of the additional demodulation reference signal in the PDSCH is configured by the RRC signaling,
wherein the processor controls reception of the additional demodulation reference signal in the PDSCH,
wherein the demodulation reference signal is mapped to no physical resource where the demodulation reference signal overlaps with another reference signal in the PDSCH,
wherein a mapping position of the demodulation reference signal is determined based on one of only two configuration types based on the information of the configuration,
wherein each of the two configuration types includes at least two mapping patterns, and
wherein a number of symbols to which the demodulation reference signal is mapped in one of the at least two mapping patterns is different in time domain from a number of symbols to which the demodulation reference signal is mapped in another one of the at least two mapping patterns.

2. The terminal according to claim 1, the demodulation reference signal is mapped to a position more rearward than a physical resource reserved for another signal in a time direction in the PDSCH.

3. A base station, comprising:
a transmitter that transmits, via radio resource control (RRC) signaling, information of a configuration indicative of a group of resources among a plurality of groups of resources to which a demodulation reference signal is mapped, and transmits downlink control information (DCI) including an index; and
a processor that maps a demodulation reference signal to a resource for a physical downlink shared channel (PDSCH) among the group of resources based on the index and the group of resources,
wherein a maximum number of symbols to which the demodulation reference signal is mapped to the resource for the PDSCH is configured by the RRC signaling,
wherein an additional demodulation reference signal is further mapped in the PDSCH,
wherein a position of the additional demodulation reference signal in the PDSCH is configured by the RRC signaling,
wherein the processor controls transmission of the additional demodulation reference signal in the PDSCH,
wherein the demodulation reference signal is mapped to no physical resource where the demodulation reference signal overlaps with another reference signal in the PDSCH,
wherein a mapping position of the demodulation reference signal is determined based on one of only two configuration types based on the information of the configuration,
wherein each of the two configuration types includes at least two mapping patterns, and
wherein a number of symbols to which the demodulation reference signal is mapped in one of the at least two mapping patterns is different in time domain from a number of symbols to which the demodulation reference signal is mapped in another one of the at least two mapping patterns.

4. A wireless communication system comprising a base station and a terminal,
wherein the base station comprises:
a transmitter that transmits, via radio resource control (RRC) signaling, information of a configuration indicative of a group of resources among a plurality of groups of resources to which a demodulation reference signal is mapped, and transmits downlink control information (DCI) including an index; and a first processor that maps a demodulation reference signal to a resource for a physical downlink shared channel (PDSCH) among the group of resources based on the index and the group of resources, wherein the terminal comprises:

a receiver that receives, via the RRC signaling, the information of the configuration indicative of the group of resources among the plurality of groups of resources to which the demodulation reference signal is mapped and the DCI including the index; and a second processor that controls reception of the demodulation reference signal in the PDSCH using the resource among the group of resources based on the index and the group of resources, and wherein a maximum number of symbols to which the demodulation reference signal is mapped to a resource for the PDSCH is configured by the RRC signaling, wherein an additional demodulation reference signal is further mapped in the PDSCH, wherein a position of the additional demodulation reference signal in the PDSCH is configured by the RRC signaling, wherein the second processor controls reception of the additional demodulation reference signal in the PDSCH, wherein the demodulation reference signal is mapped to no physical resource where the demodulation reference signal overlaps with another reference signal in the PDSCH, wherein a mapping position of the demodulation reference signal is determined based on one of only two configuration types based on the information of the configuration, wherein each of the two configuration types includes at least two mapping patterns, and wherein a number of symbols to which the demodulation reference signal is mapped in one of the at least two mapping patterns is different in time domain from a number of symbols to which the demodulation reference signal is mapped in another one of the at least two mapping patterns.

5. The terminal according to claim 1, wherein a number of symbols to which the demodulation reference signal is mapped is configured by the DCI.

* * * * *